United States Patent
Ikeda et al.

(10) Patent No.: US 9,436,706 B2
(45) Date of Patent: Sep. 6, 2016

(54) IMAGE PROCESSING APPARATUS, IMAGE PROCESSING METHOD, AND STORAGE MEDIUM FOR LAYING OUT IMAGES

(71) Applicant: CANON KABUSHIKI KAISHA, Tokyo (JP)

(72) Inventors: Tohru Ikeda, Yokohama (JP); Kiyoshi Umeda, Kawasaki (JP); Yusuke Hashii, Tokyo (JP); Hiroyasu Kunieda, Yokohama (JP); Hiroyuki Sakai, Chigasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 14/476,571

(22) Filed: Sep. 3, 2014

(65) Prior Publication Data
US 2015/0063724 A1  Mar. 5, 2015

(30) Foreign Application Priority Data
Sep. 5, 2013  (JP) ................................. 2013-184045

(51) Int. Cl.
*G06K 9/54* (2006.01)
*G06K 9/60* (2006.01)
*G06F 17/30* (2006.01)

(52) U.S. Cl.
CPC ............................... *G06F 17/30259* (2013.01)

(58) Field of Classification Search
None
See application file for complete search history.

(56) References Cited

U.S. PATENT DOCUMENTS

| 8,044,945 B2* | 10/2011 | Takamori | G06F 17/30256 345/204 |
| 2005/0157189 A1* | 7/2005 | Sambongi | H04N 1/4092 348/241 |
| 2007/0076960 A1* | 4/2007 | Takamori | G06F 17/30256 382/224 |
| 2009/0083814 A1* | 3/2009 | Sekine | G11B 27/105 725/104 |
| 2010/0302595 A1* | 12/2010 | Yamada | G06K 9/4642 358/1.18 |

FOREIGN PATENT DOCUMENTS

| JP | 5-197793 A | 8/1993 |
| JP | 8-63597 A | 3/1996 |
| JP | 8-77334 A | 3/1996 |
| JP | 2541688 B2 | 10/1996 |
| JP | 11-53525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-30667 A | 1/2003 |
| JP | 3469031 B2 | 11/2003 |
| JP | 2009-245071 A | 10/2009 |
| JP | 2010-251999 A | 11/2010 |
| JP | 2010-273144 A | 12/2010 |

* cited by examiner

Primary Examiner — Feng Niu
(74) Attorney, Agent, or Firm — Canon USA, Inc. IP Division

(57) ABSTRACT

An image group including at least one image is acquired, a layout candidate is created, by laying out images included in an acquired image group, and the created layout candidate is evaluated. Evaluation of the layout candidate is performed based on evaluation of each image laid out within a layout, and a scaling factor based on image size of the image placed in the layout, and a size of the image.

15 Claims, 24 Drawing Sheets

FIG. 9

```xml
<?xml version="1.0" encoding="utf-8"? >
<IMAGEINFO>
        <BaseInfo>
                <ID>0x00000001</ID>
                <ImagePath>C:\My Picture\IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                . . .
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>

</UserInfo>
        . . .
</IMAGEINFO>
```

FIG. 12

```
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 16

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . .

</LayoutInfo>
```

FIG. 22

```xml
<?xml version="1.0" encoding="utf-8" ?>
<LayoutInfo>
    <BASIC>
        <Theme>growth</Theme>
        <PageSize>A4</PageSize>
        <Resolution>300</Resolution>
        <MainGroup>son</MainGroup>
        <SubGroup>son, father</SubGroup>
    </BASIC>
    <ImageSlot>
        <ID>0</ID>
        <POSITION>
            <LeftTop x=400, y=900/>
            <LeftBottom x=400, y=1500/>
            <RightTop x=1300, y=900/>
            <RightBottom x=1300, y=1500/>
        </POSITION>
        <Shape>Rectangle</Shape>
        <PersonGroup>SubGroup</PersonGroup>
    </ImageSlot>
    <ImageSlot>
        <ID>1</ID>
        <POSITION>
            <LeftTop x=700, y=100/>
            <LeftBottom x=700, y=500/>
            <RightTop x=1100, y=100/>
            <RightBottom x=1100, y=500/>
        </POSITION>
        <Shape>ellipse</Shape>
        <PersonGroup>MainGroup</PersonGroup>
    </ImageSlot>
    <ImageSlot>
        <ID>2</ID>
        <POSITION>
            <LeftTop x=1100, y=200/>
            <LeftBottom x=1100, y=600/>
            <RightTop x=1450, y=200/>
            <RightBottom x=1450, y=600/>
        </POSITION>
        <Shape>ellipse</Shape>
        <PersonGroup>MainGroup</PersonGroup>
    </ImageSlot>
           . . . . . . .
</LayoutInfo>
```

FIG. 23

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 24

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimmingRatio>50.0</TrimmingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimmingRatio>38.0</TrimmingRatio>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimmingRatio>53.0</TrimmingRatio>
        </ImageSlot>

. . . . . . .

</LayoutInfo>
```

& # IMAGE PROCESSING APPARATUS, IMAGE PROCESSING METHOD, AND STORAGE MEDIUM FOR LAYING OUT IMAGES

BACKGROUND OF THE INVENTION

1. Field of the Invention

The present disclosure generally relates to image processing and, more particularly, to an image processing apparatus, an image processing method, and a storage medium.

2. Description of the Related Art

Data of a massive number of digital pictures shot by users using digital still cameras (hereinafter also "DSC"), multi-functional cellular phones having camera functions, and so forth, and saved in personal computers (PCs) which users own, or storage services provided on the Internet.

There has been the need for a user, desiring to find where a desired image has been saved in the massive number of digital pictures, to browse through a vast number of images. This has been detrimental with regard to the usability of browsing and searching for images.

Accordingly, Japanese Patent Laid-Open No. 2009-245071 proposes a method to create one or multiple layout candidates by changing parameters of past layouts, stored in a layout table.

Now, many defective images, due to shaking or the like, are included in an image group of images taken by the user, and there are cases where the user keeps such images undeleted.

According to Japanese Patent Laid-Open No. 2009-245071, in a case of creating a layout image by selecting images from an image group including defective images, a layout image which provides the user with little satisfaction will be created if a defective image is selected.

On the other hand, if the entire layout image including one or more images is evaluated and layout images are proposed to the user in order of those evaluated highly, layout images not including defective images due to shaking or the like will be proposed if such images are given low evaluation as defective images. However, even if the user desires a layout image including such a defective image due to shaking, due to there being no replacement for that image or the like, no layout image including the image will be proposed.

SUMMARY OF THE INVENTION

It has been found desirable to provide an apparatus and method whereby user satisfaction with layout images can be improved.

According to an aspect of the present disclosure, an apparatus includes an acquisition unit configured to acquire an image group including at least one image; a creating unit configured to create a layout candidate, by laying out images included in an image group acquired by the acquisition unit; and an evaluation unit configured to evaluate the layout candidates created by the creating unit, based on evaluation of each image laid out within the layout, and a scaling factor based on the size of the image placed in the layout, and the size of the image.

Further features of the present disclosure will become apparent from the following description of exemplary embodiments with reference to the attached drawings.

BRIEF DESCRIPTION OF THE DRAWINGS

FIG. 9 is a diagram illustrating an example of a format for saving image analysis results.

FIG. 12 is a diagram illustrating an example of a format for saving person attribute information.

FIG. 14 is a diagram illustrating an example of a format for saving the layout template in FIG. 13.

FIG. 16 is a diagram illustrating an example of a format for saving the layout template in FIG. 15.

FIG. 19A regarding automatic trimming processing, FIG. 19B regarding a method to calculate brightness suitability, and FIG. 19C regarding a method to calculate saturation suitability.

FIG. 22 is a diagram illustrating an example of holding a decided theme and main character information.

FIG. 23 is a diagram illustrating an example of holding a decided theme and main character information.

FIG. 24 is a diagram illustrating an example of holding generated layout information.

DESCRIPTION OF THE EMBODIMENTS

Various exemplary embodiments, features, and aspects of the disclosure will be described in detail below with reference to the drawings.

First Embodiment

A first embodiment of the present disclosure will be described regarding automatically generating a layout output product using an input image group. It should be noted that the following description is but an exemplary illustration by way of an embodiment, and that the present disclosure is by no way restricted to the following embodiment.

Figure 1:
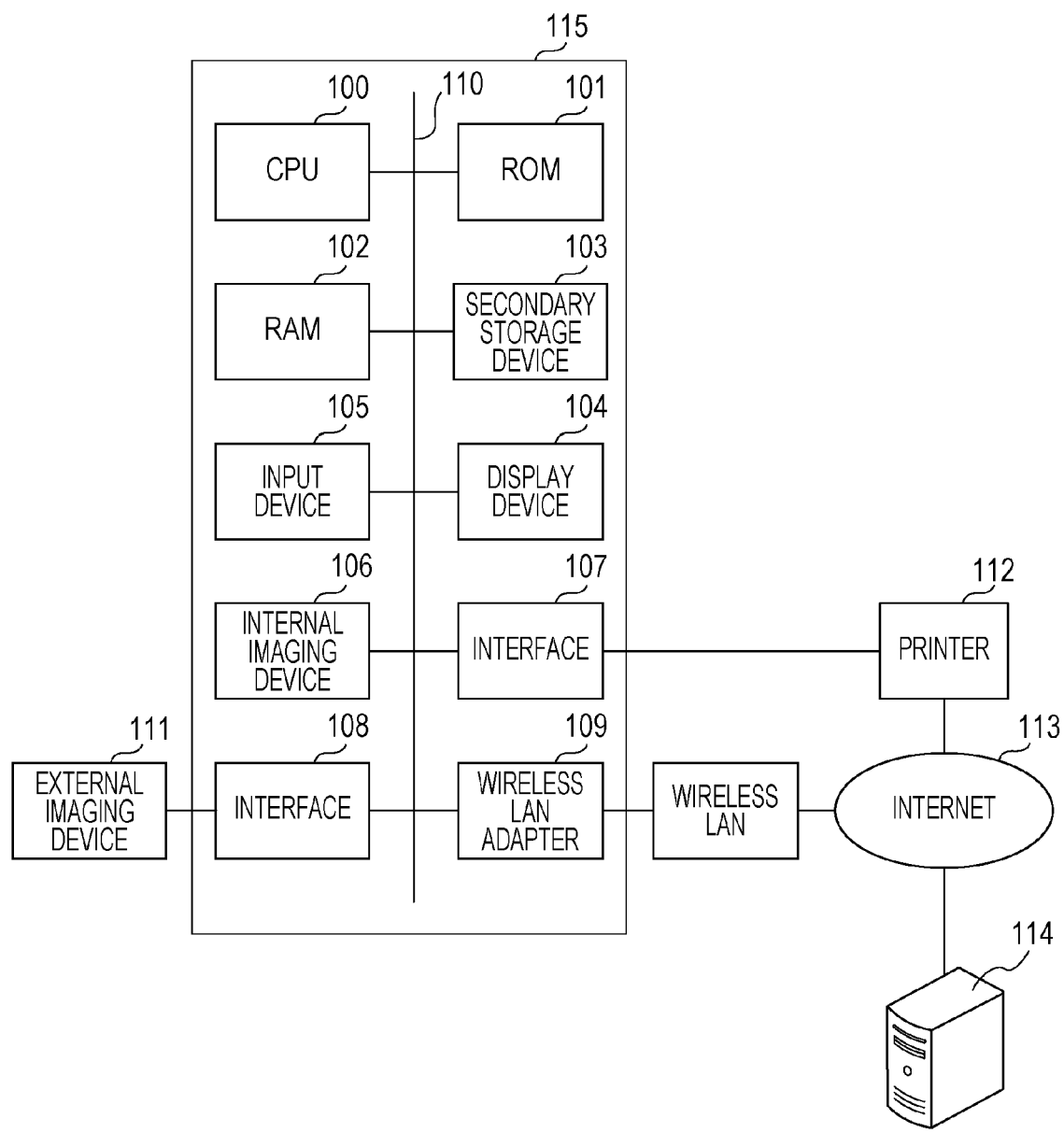
FIG. 1 is a hardware configuration diagram of an image processing apparatus according to a first embodiment.

FIG. 1 is a block diagram illustrating a hardware configuration example of an image processing apparatus according to the first embodiment. An image processing apparatus 115 in FIG. 1 includes a central processing unit (CPU) 100, read-only memory (ROM) 101, random access memory (RAM) 102, a secondary storage device 103, a display device 104, an input device 105, an internal imaging device 106, an interface 107, an interface 108, and a wireless LAN adapter 109. These components are mutually connected by a control bus/data bus 110. The wireless LAN adapter 109 is connected to a wireless LAN which exists at the location where the image processing apparatus 115 is installed. As used herein, the term "unit" generally refers to any combination of software, firmware, hardware, or other component that is used to effectuate a purpose.

The image processing apparatus 115 is a computer, for example. The CPU 100 executes information processing which will be described in the first embodiment, following programs. The ROM 101 stores programs such as an application which will be described below, which are executed by the CPU 100. The RAM 102 serves as memory to temporarily store various types of information when the CUP 100 is executing programs. The secondary storage device 103 is a storage medium which saves databases or the like in which are stored image files and image analysis results. A hard disk is one example of the secondary storage device 103. The display device 104 is a display monitor for example, which provides processing results of the first embodiment, a user interface (UI) described below, and so forth, to the user. The display device 104 may have touch panel functions. The input device 105 is a mouse, keyboard, or the like, for the user to input instructions such as processing for image correction, or the like.

Images that have been imaged by the internal imaging device 106 are subjected to predetermined image processing, and thereafter stored in the secondary storage device 103. The image processing apparatus 115 can also read in image data from an external imaging device 111 connected via an interface 108. The wireless LAN is further connected to the Internet 113 via an unshown modem/router, and thus the image processing apparatus 115 can acquire image data from an external server 114 connected to the Internet 113.

A printer 112 which outputs images and the like is connected to the image processing apparatus 115 via an interface 107. The printer 112 is further connected to the Internet 113, and can exchange print data with the image processing apparatus 115 either via the interface 107 or over the Internet 113 via the wireless LAN and wireless LAN adapter 109.

Figure 2:
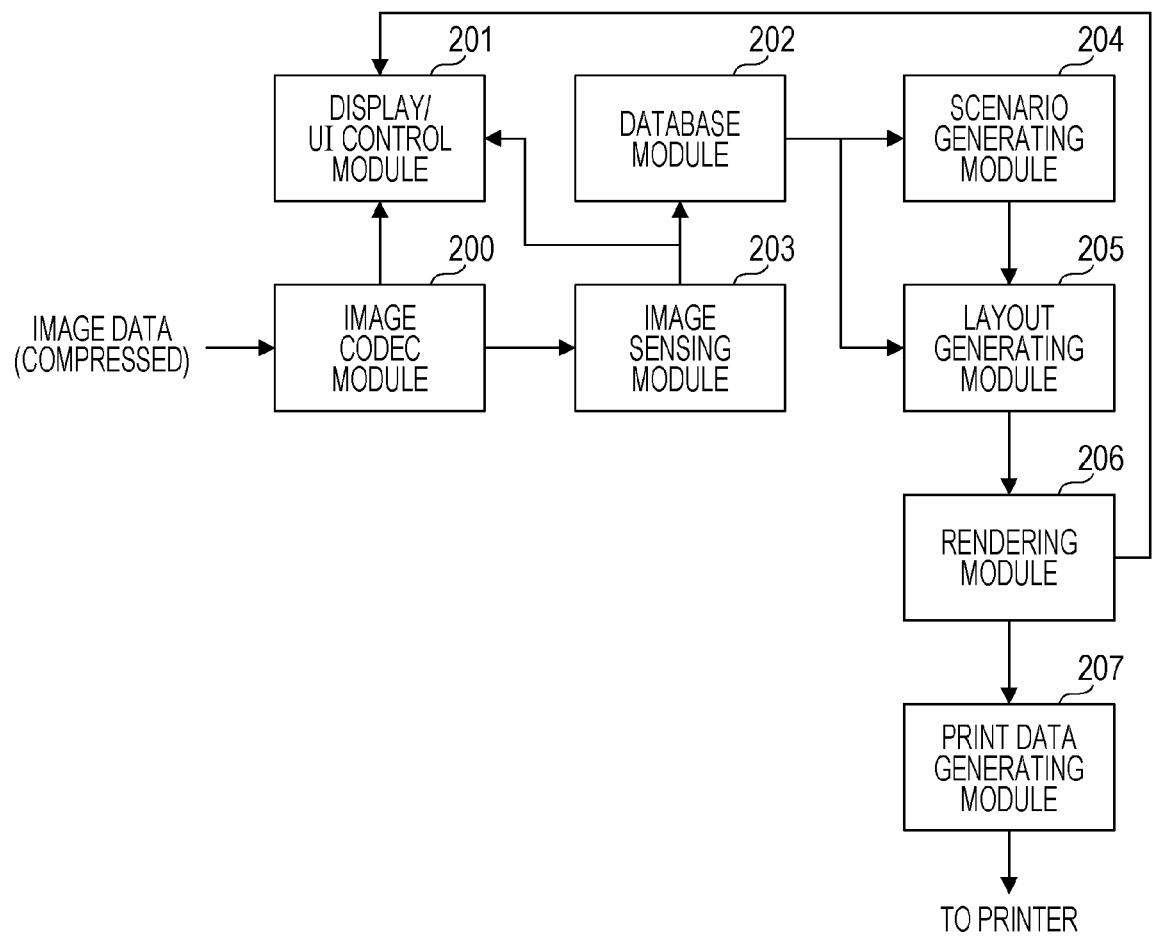
FIG. 2 is a software block diagram according to the first embodiment.

FIG. 2 is a block diagram illustrating the configuration of software, such as the aforementioned application and so forth, according to the present embodiment.

Image data acquired by the hardware is normally compressed according to a compression format such as Joint Photography Expert Group (JPEG) or the like. Accordingly, an image codec module 200 decompresses the image data according to the compression format by which the image data was compressed, and converts the image data into RGB point-sequential bitmap format image data. The converted bitmap data is transmitted to a display/UI control module 201, and is displayed on the display device 104 such as a display monitor or the like.

The bitmap data is further input to an image sensing module 203, and there is subjected to various types of image analysis processing, detailed description of which will be given later. Various types of attribute information of the image obtained in this analysis processing are saved in a predetermined format in the above-described secondary storage device 103, by a database module 202. Hereinafter, the terms "image analysis processing" and "sensing processing" will be used interchangeably.

A scenario generating module 204 generates layout conditions to be automatically generated, in accordance with various conditions which the user has input. A layout generating module 205 performs processing to automatically generate a layout following the scenario which has been generated.

The generated layout is used to generate display bitmap data at a rendering module 206. The bitmap data is sent to the display/UI control module 201, and the results are displayed on the display device 104, which is a display monitor or the like. On the other hand, the rendering results are further sent to a print data generating module 207, there converted into print command data for printers, and sent to a printer.

Figure 3:
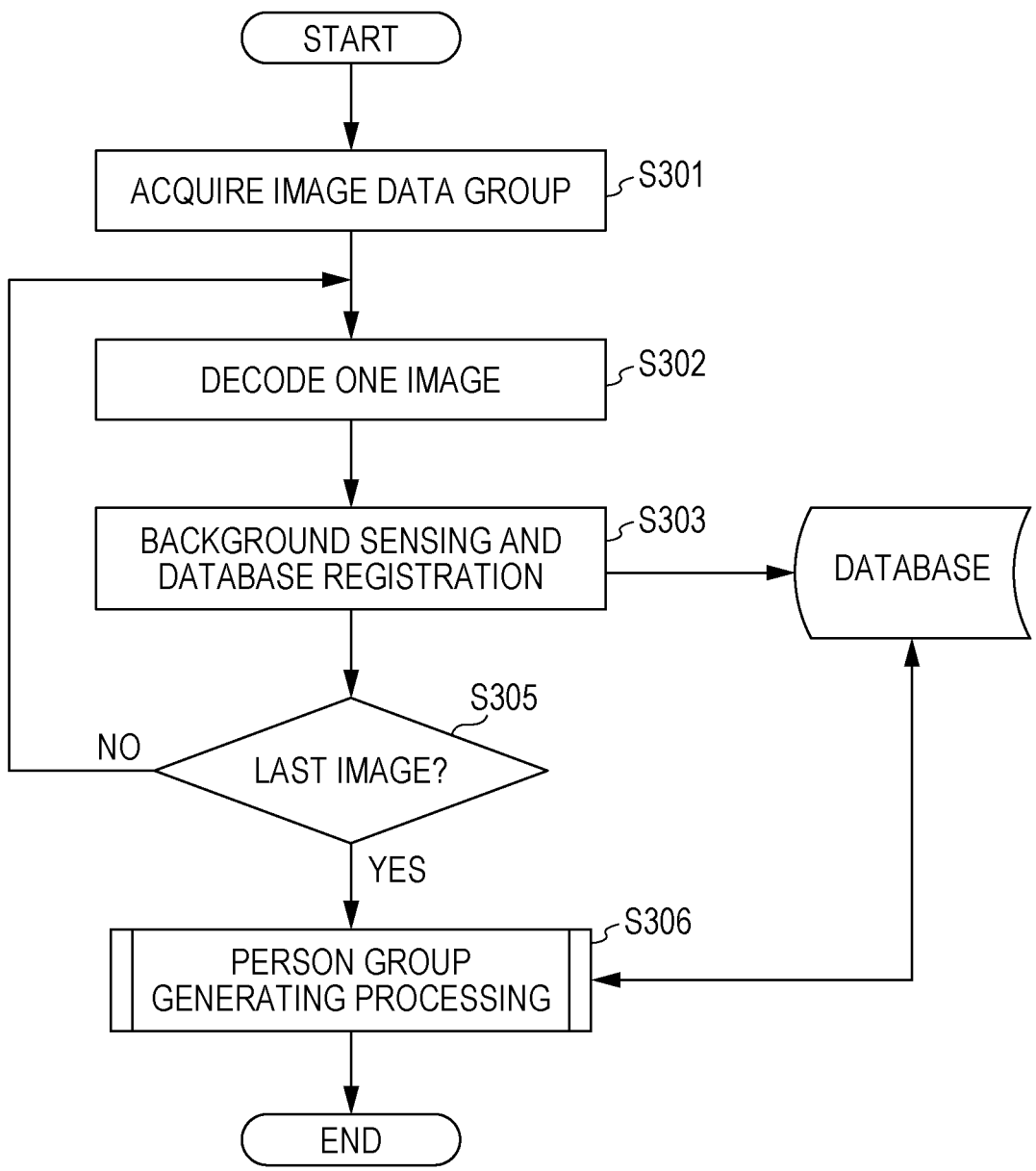
FIG. 3 is a flowchart illustrating image analysis processing according to the first embodiment.
Figure 4:
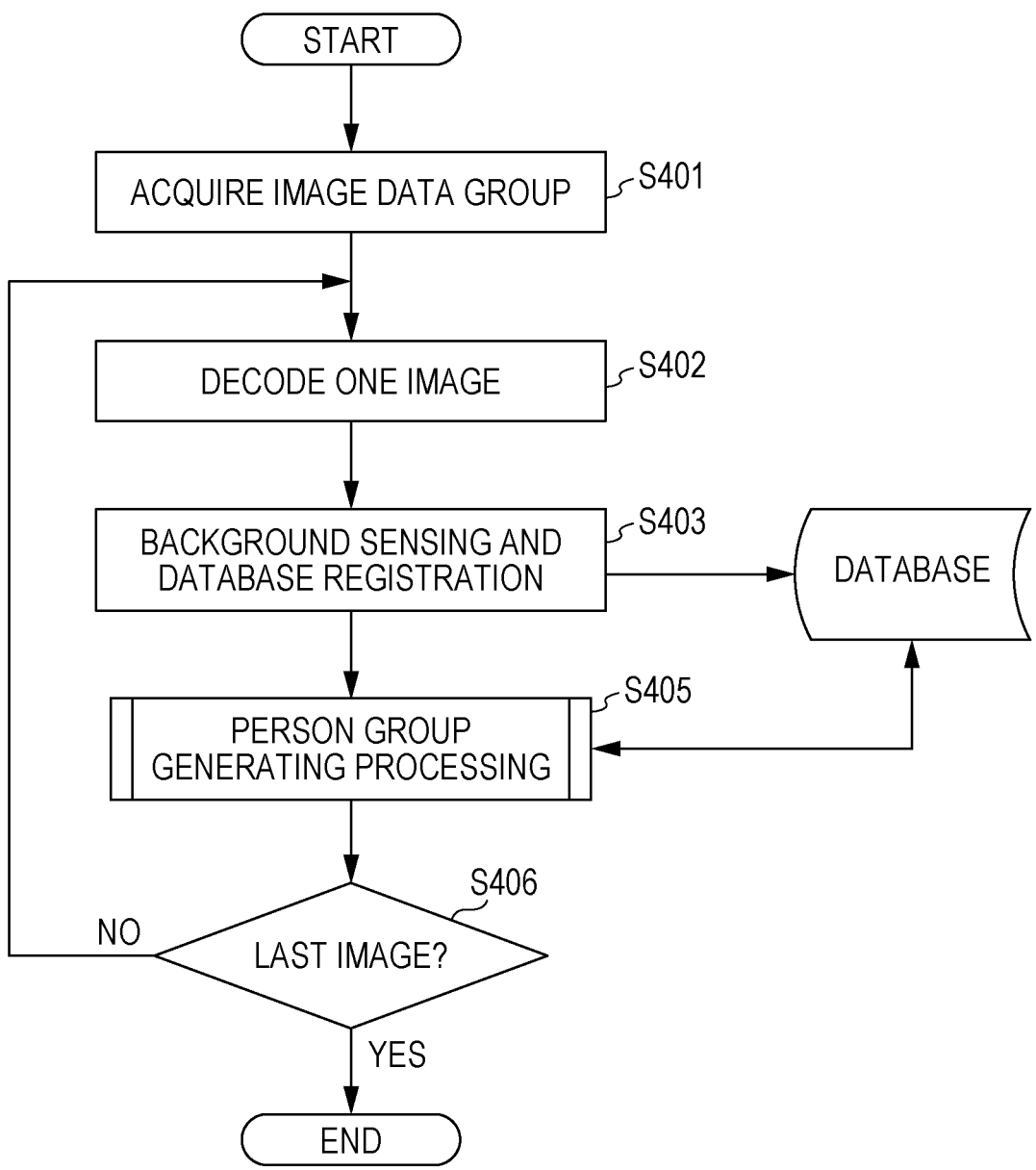
FIG. 4 is a flowchart illustrating image analysis processing according to the first embodiment.
Figure 5:
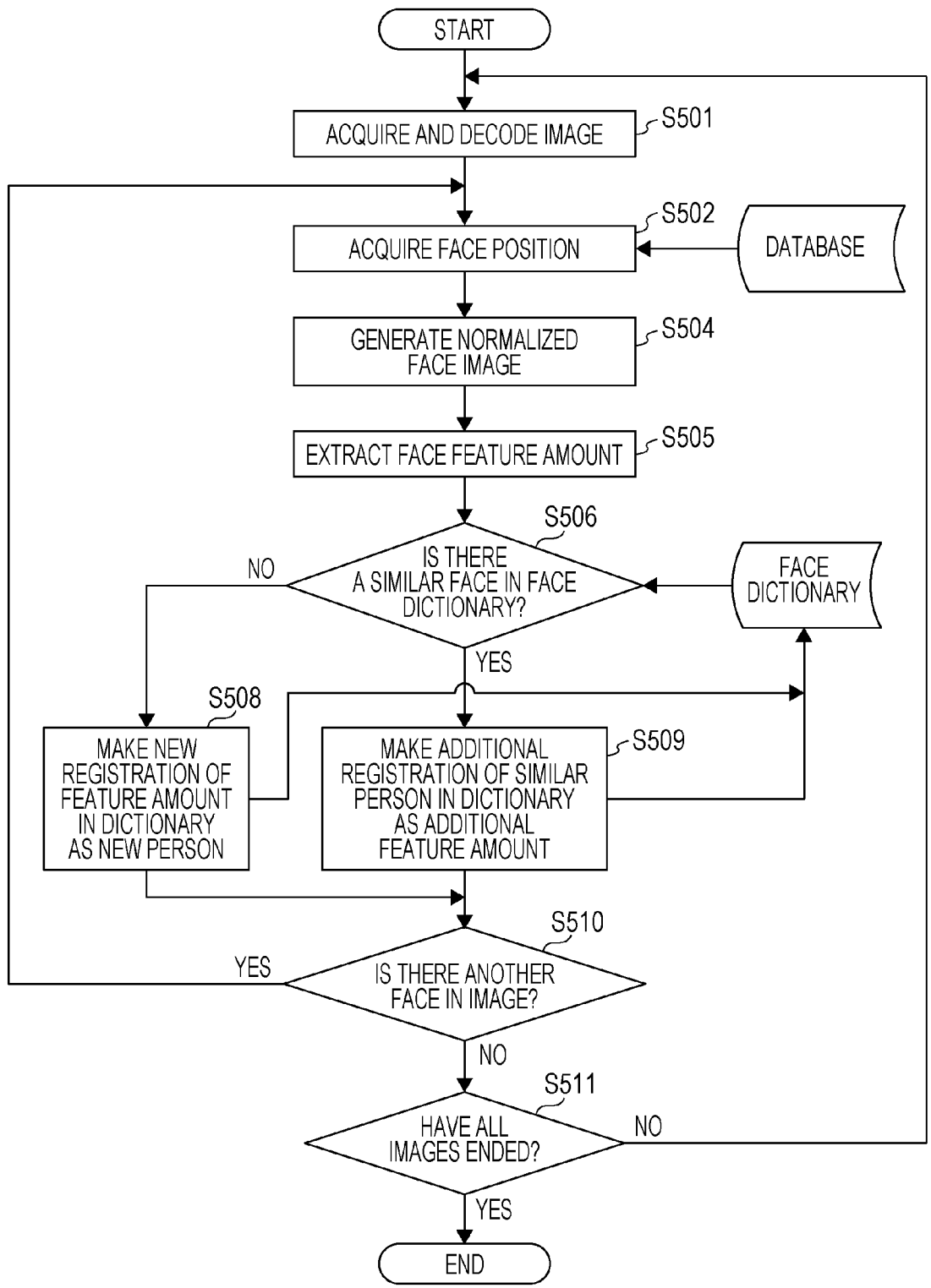
FIG. 5 is a flowchart illustrating person group generating processing according to the first embodiment.
Figure 6:
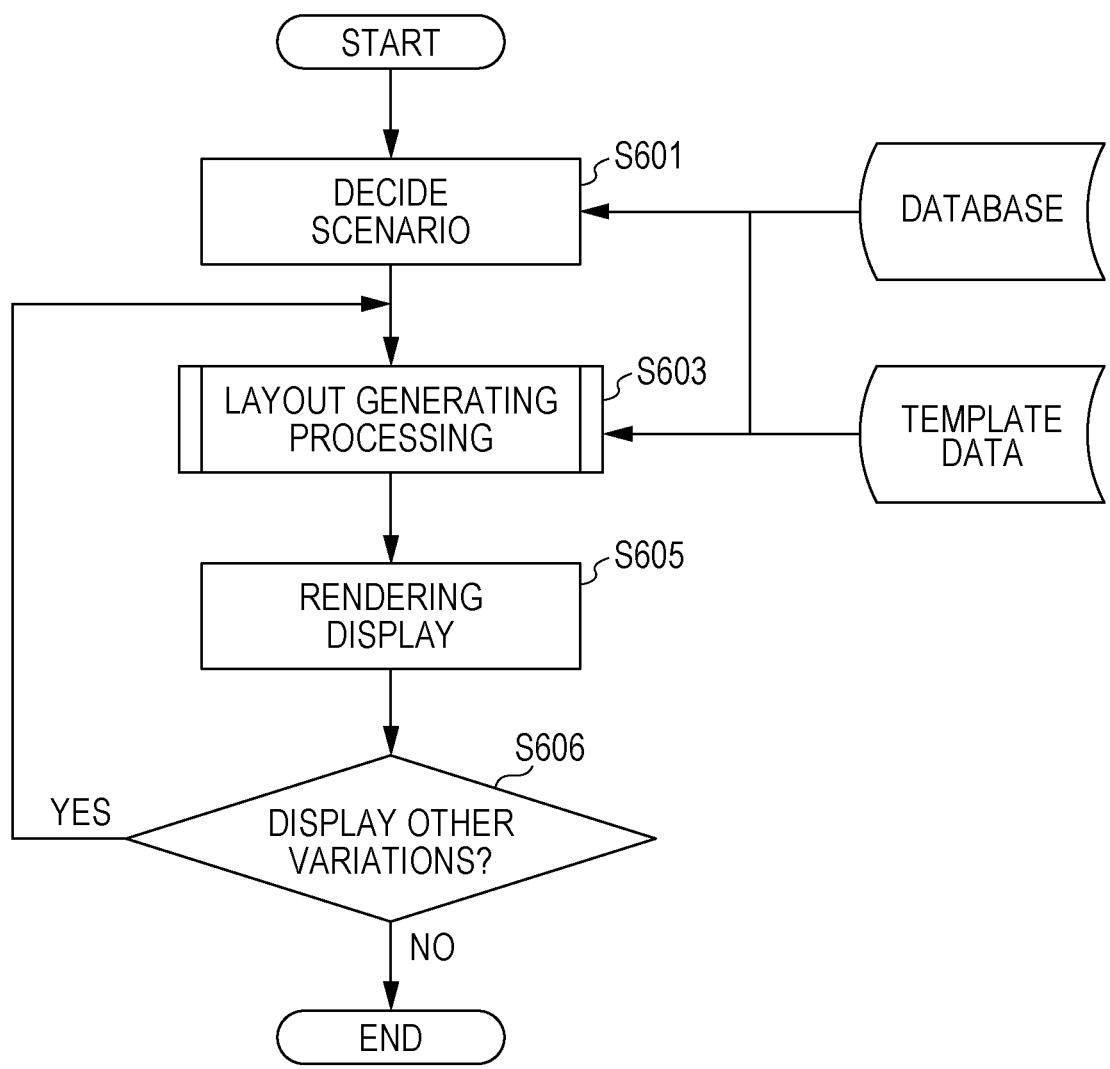
FIG. 6 is a flowchart illustrating automatic layout proposal processing according to the first embodiment.

FIGS. 3 through 6 are basic image processing flowcharts of the application according to the present embodiment. More specifically, FIGS. 3 and 4 illustrate a flow including processing performed before and after the processing performed at the image sensing module 203, where multiple image data groups including one or more images are acquired, analysis processing is performed on each image, and the results are stored in a database. FIG. 5 illustrates a flow of processing to group face information considered to be the same person, based on detected face position information. FIG. 6 illustrates a flow of processing to decide a scenario for layout creation based on image analysis information and various types of information which the user has input, and to automatically generate a layout based on the scenario.

In S301 in FIG. 3, one or more image data groups including one or more images are acquired. Examples of the way in which the image data group is acquired include the user connecting to the image processing apparatus 115 an imaging device or memory card storing images which have been shot, so that the images are read in. Other examples include acquiring an image data group of images which have been shot by an internal imaging device and saved in the secondary storage device 103, and acquiring an image data group from a location other than the image processing apparatus 115, such as from an external server 114 on the Internet, for example, via wireless LAN or the like.

Figure 8A:
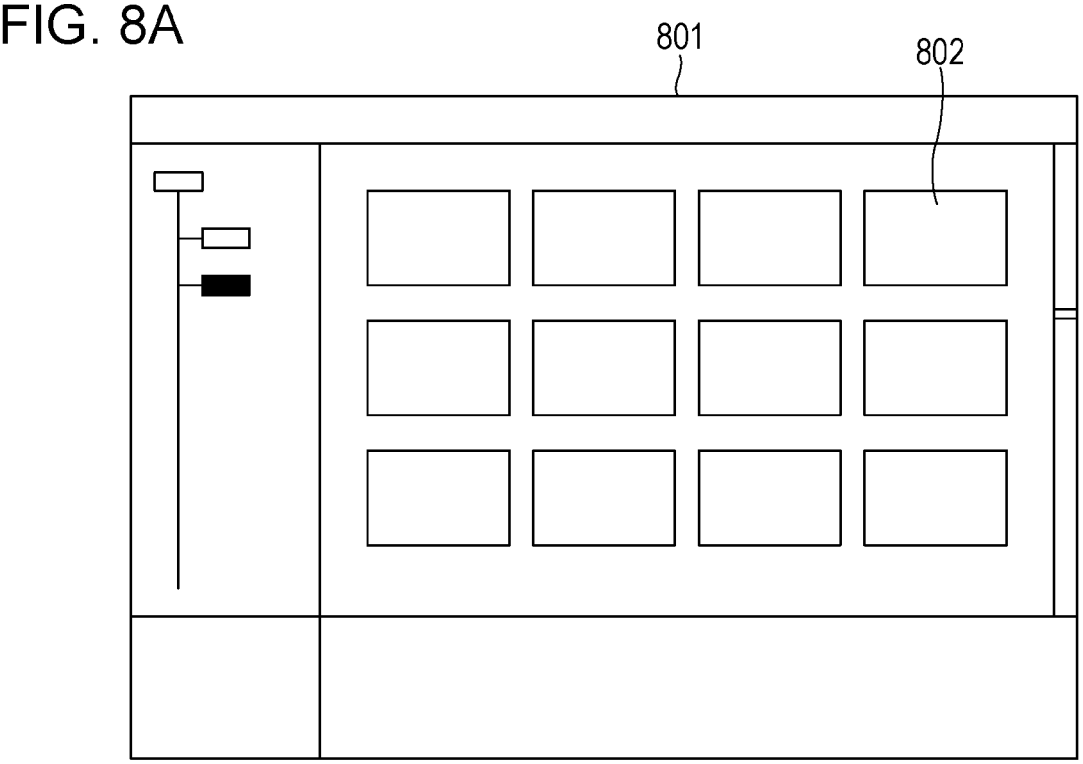
FIGS. 8A and 8B are diagrams illustrating display examples of image groups according to the first embodiment.
Figure 8B:
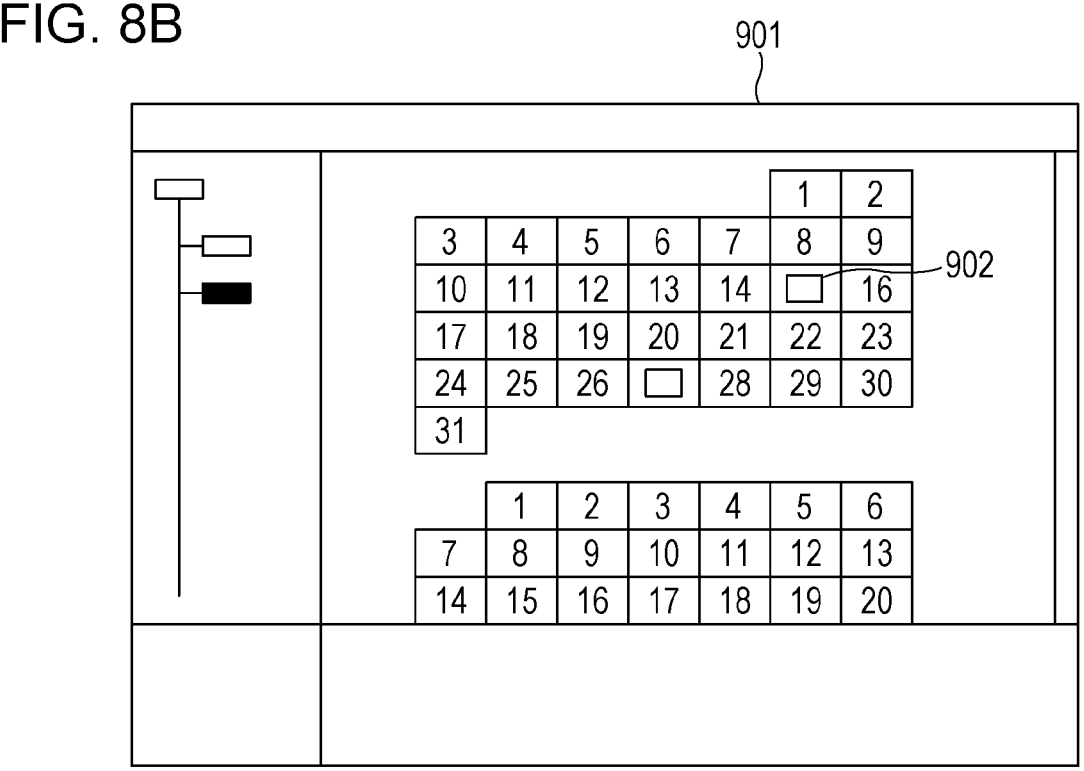

Upon acquiring the image data group, a thumbnail group thereof is displayed on the UI as illustrated in FIGS. 8A and 8B. FIG. 8A illustrates a UI801 where image thumbnails 802 are displayed in increments of folders where the images are stored in the secondary storage device 103. FIG. 8B illustrates an arrangement where image data is managed by date in a UI 901 formed like a calendar. Clicking on a date portion 902 brings up a thumbnail list of images taken on that date, such as illustrated in FIG. 8A.

Next, the images are decoded in S302. More specifically, an application searches for images which have been newly saved and not subjected to sensing processing yet, and the extracted images are converted from compressed data into bitmap data by the image codec module 200.

Next, in S303 the bitmap data is subjected to various types of sensing processing. The term sensing processing as used here includes the various types of processing illustrated in Table 1. Examples of sensing processing in the present embodiment that are given here are face detection, feature amount analysis of the image, and scene analysis. Data type results such as illustrated in Table 1 are calculated for each.

TABLE 1

Example of Attribute Information Obtained as Result of Image Analysis

| General sensing classification | Detailed sensing classification | Data type | Value |
|---|---|---|---|
| Basic feature amount of image | Average luminance | int | 0 to 255 |
| | Average saturation | int | 0 to 255 |
| | Average hue | int | 0 to 359 |
| Face detection | Number of faces | int | 0 to MAXFACE |
| | Coordinate position | int * 8 | 0 to Width or Height |
| | Average Y in face region | int | 0 to 255 |
| | Average Cb in face region | int | −128 to 127 |
| | Average Cr in face region | int | −128 to 127 |
| Scene analysis | Scene results | char | Landscape Nightscape Portrait Underexposure Others |

Each sensing processing will be described. The overall average luminance and average saturation, which are basic feature amounts of the image, can be obtained by known methods, so detailed description thereof will be omitted. The average luminance for each pixel in the image can be obtained by converting (conversion expression omitted from description here) RGB components into known luminance/color-difference components (e.g., YCbCr components), and calculating the average value of the Y component. The average saturation can be obtained by calculating S in the following Expression for each pixel regarding the aforementioned CbCr components, and then calculating the average of all S's.

$$S = \sqrt{Cb^2 + Cr^2}$$

The average hue (AveH) in the image is a feature amount to evaluate the shade of color of the image. The hue of each pixel can be calculated using a known hue intensity saturation (HIS) conversion expression, and AveH can be obtained by averaging the obtained values of the entire image. These feature amounts may be calculated for the entire image as described above, or the image may be divided into regions of predetermined sizes and the feature amounts calculated for each region.

Next, person face detection processing will be described. Known methods can be used as a person face detection technique employed in the present embodiment.

Japanese Patent Laid-Open No. 2002-183731 describes a method where eye regions are detected from an input image, and around the eye regions are taken as a face candidate region. The luminance gradient and weight of luminance gradient for each pixel are calculated with regard to the face candidate region, and these values are compared with the gradient of an ideal face reference image, and gradient weight thereof, that have been set beforehand. If the average angle between the gradients is not greater than a predetermined threshold value, the input image is determined to include a face region.

Japanese Patent Laid-Open No. 2003-30667 describes a method where a skin color region is first detected from the image, and the position of eyes can be detected in this region by detecting pixels having the color of the human iris.

Japanese Patent Laid-Open No. 8-63597 describes a method where a degree of matching is calculated between multiple templates having shapes of faces, and an image. The template of which the degree of matching is the highest is selected, and if the highest degree of matching is not smaller than a predetermined threshold value, the region within the selected template is set as a face candidate region. The position of the eyes can be detected using the same template.

Further, Japanese Patent Laid-Open No. 2000-105829 describes a method where first, a nose image pattern is used as a template, and a position in the entire image or in a region specified within the image is scanned, and a position which matches the template best is output as a nose position. Next, the region above the nose position in the image is considered to be the region where eyes exist, so this eye-existing region is scanned using an eye image pattern as a template and the degree of matching is calculated. An eye-existing candidate position set, which is a set of pixels in which the degree of matching is greater than a certain threshold value, is thus obtained. Continuous regions included in this eye-existing candidate position set are divided as clusters, and the distance between each cluster and the nose position is calculated. The cluster regarding which the distance is the shortest is determined to be the eye position, whereby organ position detection can be realized.

Other methods to detect faces of persons include the methods to detect faces and organ positions such as described in Japanese Patent Laid-Open Nos. 8-77334, 2001-216515, 5-197793, 11-53525, 2000-132688, 2000-235648, and 11-250267. The person face detection processing method is not restricted in particular, and the method described in Japanese Patent No. 2541688 may be employed.

Person face detection processing enables the number of faces and the coordinate positions of each face to be obtained for each input image. Finding the face coordinate position in the image enables the feature amount of the face region to be analyzed. For example, obtaining the average YCbCr value of the pixel values included in the face region, for each face region, allows the average luminance and average color difference to be obtained for the face regions.

Also, scene analysis processing can be performed using feature amounts of images. This scene analysis processing can be carried out by methods disclosed in Japanese Patent Laid-Open Nos. 2010-251999 and 2010-273144, for example. Scene analysis processing enables IDs to be obtained which distinguish photography scenes, such as Landscape, Nightscape, Portrait, Underexposure, and Others. While sensing information is acquired by the above-described sensing processing in the present embodiment, other sensing information may be utilized as well.

The sensing information thus acquired is saved in the database module 202. The sensing information may be described in a general-purpose format such as eXtensible Markup Language (XML) for example, such as illustrated in FIG. 9, and stored in the database module 202 in this format. FIG. 9 illustrates an example of describing attribute information for each image divided into three categories.

The first is the BaseInfo tag. This is a tag to store information added to an image file acquired beforehand, such as image size and photography date/time information. This tag includes an identifier (ID) for each image, the location where the image file is stored, image size, photography date/time, and so forth.

The second is the SensInfo tag. This is a tag to store the results of the above-described image analysis processing. Stored here are the average luminance, average saturation, average hue, and scene analysis results, for the entire image. Also stored here are face positions of persons in the image, and information relating to face color.

The third is the UserInfo tag. This is a tag to store information which the user has input for each image. Details of this tag will be described later.

The method of storing image attribute information in a database is not restricted to the above-described method. Any other known format may be used.

In S305 in FIG. 3, determination is made whether or not the image processed in S302 and S303 above is the last image in the image data group. If the last image, the flow advances to S306, and otherwise, returns to S302.

In S306, processing to generate a group for each person is performed using the face position information detected in S303. Automatic grouping of person faces beforehand enables efficient tagging of persons by the user later.

Forming person groups here is executed by the processing flow illustrated in FIG. 5, using a known personal recognition method. Such personal recognition processing is executed by extracting feature amounts of facial organs, such as the eyes and the mouth, and comparing the similarity in the relationship therebetween. An example of personal recognition processing is disclosed in Japanese Patent No. 3469031, so detailed description will be omitted here.

FIG. 5 is a basic flowchart of the person group generating processing in S306. First, in S501, images saved in the secondary storage device 103 are sequentially read out and decoded. In S502, the database module 202 is accessed so as to acquire the number of faces included in the image being processed and the positional information regarding the faces. Next, in S504, a normalized face image is generated, to perform personal recognition processing.

The term "normalized face image" here refers to a face image obtained by cropping out faces which exist in the image, and performing conversion on these faces, which have various sizes, orientations, and resolutions, so that the sizes and orientations are all the same. The positions of organs such as the eyes and mouth are important to perform personal recognition, so the size of normalized face images preferably is such that these organs can be accurately recognized. Generating such a normalized face image does away with the need to handle faces of various resolutions in the feature amount detecting processing.

Next, in S505, face feature amounts are calculated from the normalized face images. Face feature amounts are features including the position and size of organs such as the eyes, mouth, and nose, and further including facial outline and so forth.

Further, in S506, it is determined whether or not the feature amounts of faces in the image currently being processed have similarity with face feature amounts in a database in which are stored face feature amounts for each person identifier (dictionary ID) beforehand (hereinafter referred to as "face dictionary"). This similarity is calculated by comparing feature amounts managed within the dictionary ID, and feature amounts newly input. The feature amounts used at this time is information of the position of organs such as the eyes, nose, and mouth, the distance between the organs, and so forth, that is held. The greater the similarity between the feature amounts is, the higher the degree of similarity is, and less similarity there is between the feature amounts, the lower the degree of similarity is. The degree of similarity may assume a value between 0 and 100. Whether similar or not is determined by comparing the calculated degree of similarity with a preset threshold value, determining that the face is of the same person as that of the dictionary ID in a case where the degree of similarity exceeds the threshold value, and determining that the face is not of the same person in a case where the degree of similarity does not exceed the threshold value. This threshold value may be uniform for all dictionary IDs, or may be set differently for each dictionary ID.

In a case where the determination in S506 is Yes, the flow advances to S509, where the feature amounts of this face are added to the dictionary ID as the same person.

In a case where the determination in S506 is No, the flow advances to S508, where a new dictionary ID is issued and added to the face dictionary, since the face currently being evaluated is determined to be a person different from any person registered in the face dictionary so far. The processing of S502 through S509 is applied to all face regions detected from the input image group, thus groping the persons appearing in that image.

The results of the person group generating processing are described using ID tags for each face as illustrated in the XML format in FIG. 12, and saved in the above-described database.

While description has been made above regarding an arrangement where person group generating processing is executed after sensing processing has been completed for all images, as illustrated in FIG. 3, this is not restrictive, and an arrangement may be made such as illustrated in FIG. 4 for example, where sensing processing is performed on one image in S403, following which grouping processing is performed in S405 using the face detection position information, and these tasks are repeated. Either way, the same results can be generated.

Figure 7:
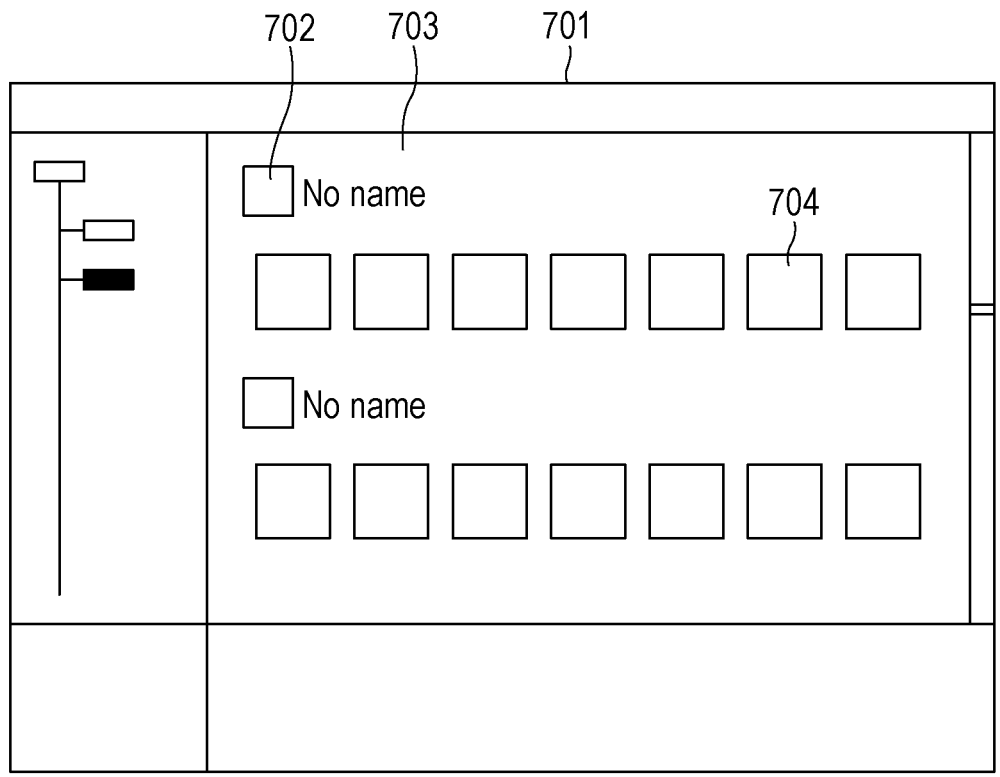
FIG. 7 is a diagram illustrating a display example of a person group according to the first embodiment.

The person groups obtained from this person group generating processing are displayed in a UI 701 such as illustrated in FIG. 7. In FIG. 7, reference numeral 702 denotes a representative face image of a person group, and reference numeral 703 denotes a region to the side thereof where the name of this person group is displayed. Immediately after the automatic person grouping processing ends, the person names are displayed as "No name 1", "No name 2", and so forth, as illustrated in FIG. 7. These person names will hereinafter be referred to as "person ID". Reference numeral 704 denotes the multiple face images included in the person group. The UI 701 in FIG. 7 is capable of receiving input of person names upon having specified a region 703 for "No name X", input of information for each person, such as birthday, relation, and so forth.

The above-described sensing processing may be performed using background tasking of the operating system. In this case, the user can continue the sensing processing of the image group even if performing a different task on the computer.

Various types of attribute information relating to the image can be manually input by the user in the present embodiment. Table 2 illustrates examples of such attribute information (hereinafter "manually registered information") in list form. There are two general classifications in this manually registered information, one of which is very general and relates to settings for the overall image, and the other is information to be set for individual persons subjected to the above-described group processing.

TABLE 2

Example of Attribute Information which User can Manually Input

| Classification | Information | Data type | Value |
|---|---|---|---|
| Image | Rating | int | 0 to 5 |
| | Event | char | "travel" |
| | | | "graduation" |
| | | | "Wedding" |
| Person | Name | char | "NAME" |
| | Birthday | char | YYYYMMDD |
| | Relationship | char | "family" |

Figure 10A:
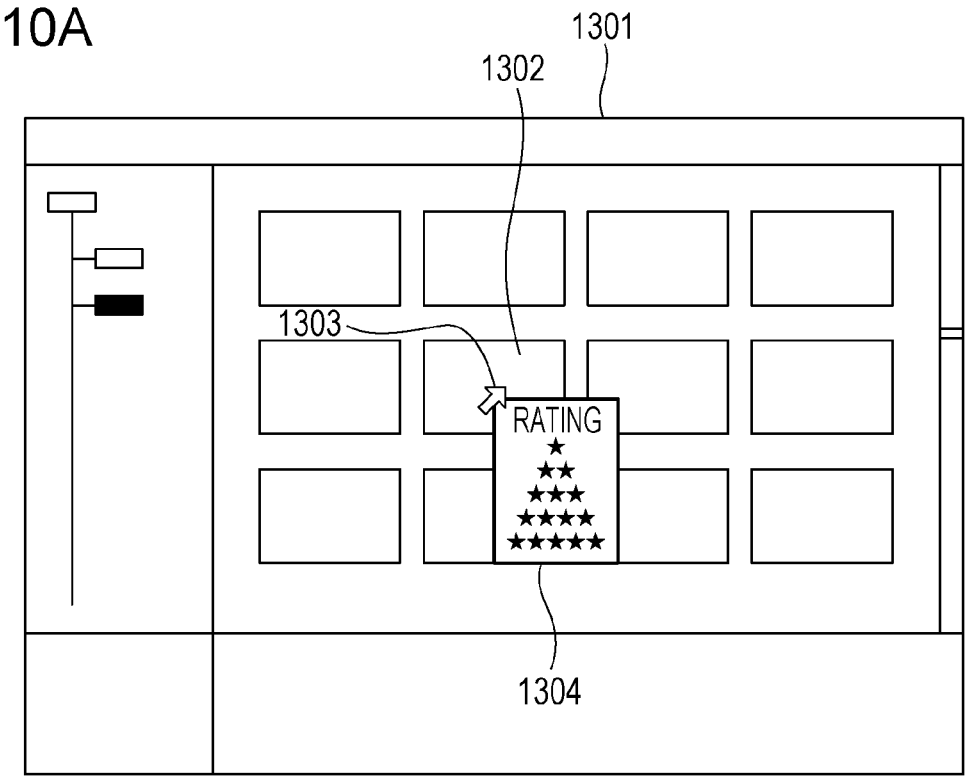
FIGS. 10A and 10B are diagrams illustrating an example of a user interface (UI) for manually inputting ratings, and an example of a UI for manually inputting event information.

One attribute information set for each image is a rating manually set by the user, to indicate how high he/she rates the image, on a scale of several levels. For example, FIG. 10A illustrates a UI 1301 where the user can select a desired thumbnail image 1302 with a mouse pointer 1303, and right-click to bring up a dialog box from which the user can input a rating. The arrangement illustrated in FIG. 10A involves selecting a number of stars from a menu in accordance with the rating. In the present embodiment, the higher the rating is, the more stars the user selects.

Alternatively, the rating may be set automatically, rather than the user setting the rating manually. For example, an arrangement may be made where the user clicks a desired image file in the state of the image thumbnail list display in FIG. 8A to transition to a single-image display screen, and the rating is set according to a count of the number of times that this transition has been made. Determination may be made that the greater the number of times counted which the user has viewed the image, the more the user likes this image, and accordingly the higher the rating is, for example.

As another example, the number of times of printout may be set for the rating. For example, if a user prints an image, it may be assumed that the user is printing that image because he/she likes that image, so the rating is set higher. Determination may be made that the greater the count of prints, the more the user likes this image, and accordingly the higher the rating is, for example.

As described above, the rating may be set manually by the user, or may be automatically set depending on the number of times of views or the number of prints. Information of these settings and counts are individually stored in the UserInfo tag of the database module 202, in the XML format illustrated in FIG. 9. For example, the rating is stored in a FavoriteRate tag, the viewing count is stored in a ViewingTimes tag, and the print count is stored in a PrintingTimes tag.

An example of information to be set for each image is event information, examples of which are "travel" indicating a family vacation trip, "graduation", "wedding", and so on.

Figure 10B:
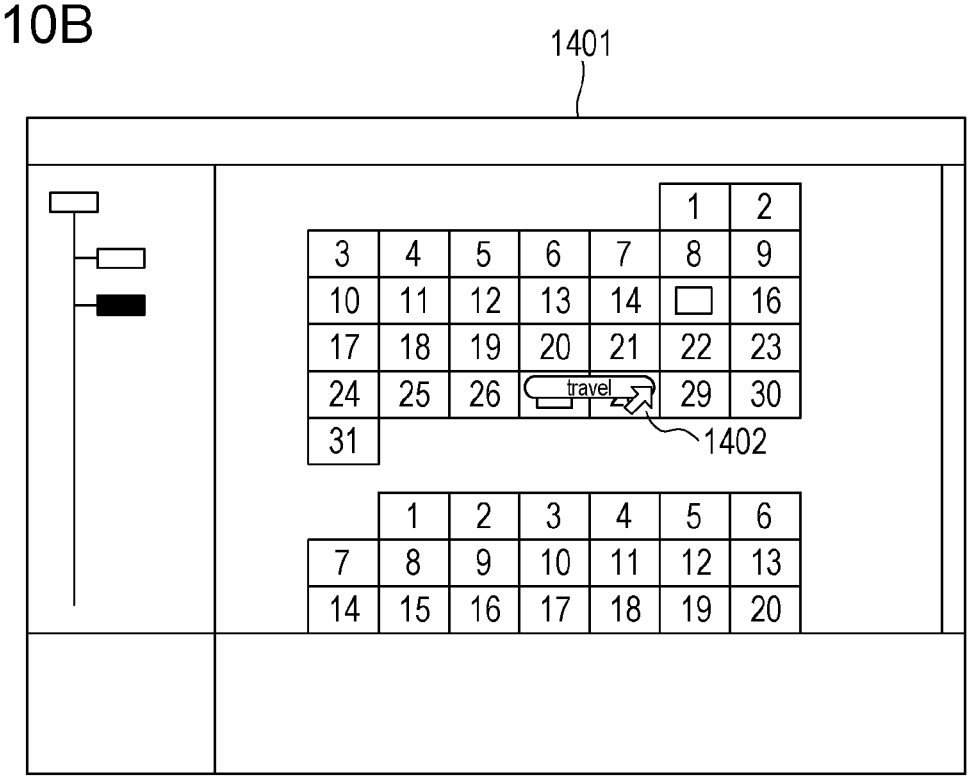

An event may be specified by specifying a desired date on the calendar by the mouse pointer 1402 such as illustrated in FIG. 10B, and inputting the name of the event for that date. The specified event name will be included in the XML format illustrated in FIG. 9, as a part of the attribute information of that image. The format in FIG. 9 associates the event name and the image using an Event tag in the UserInfo tag. Note that hereinafter, the term "associate" means to correlate.

Figure 11:
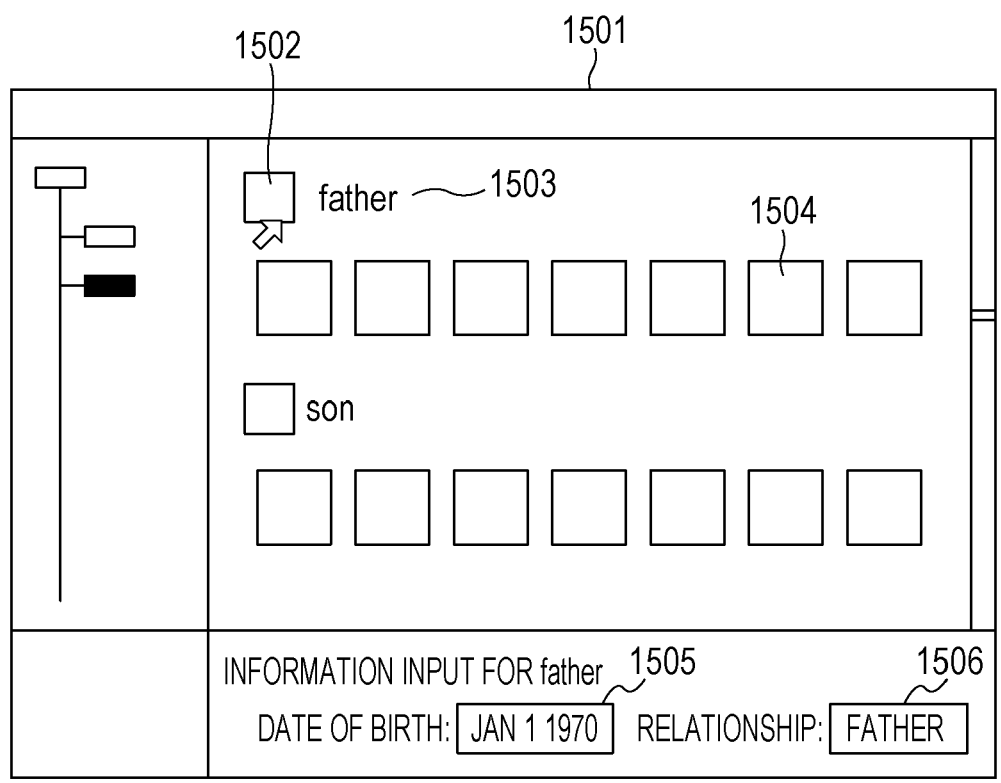
FIG. 11 is a diagram illustrating an example of a UI for manually inputting person attribute information.

Next, person attribute information will be described. FIG. 11 illustrates an UI 1501 for inputting person attribute information. Reference numeral 1502 in FIG. 11 denotes a representative face image of a certain person ("father" in this case). Reference numeral 1503 denotes a display region for a person name (person ID) of the certain person. Reference numeral 1504 denotes images (thumbnails) detected from other images, regarding which determination has been made in S506 that the face feature amounts are similar. Thus, a list of images 1504 regarding which determination has been made in S506 that the face feature amounts are similar, is displayed beneath the person ID 1503 in FIG. 11.

Immediately after the sensing processing has ended, there is no name input to each person group as illustrated in FIG. 7, but any person name can be input by instructing the "No name" portion 702 using a mouse pointer.

The birthday of each person, and the relationship as to the user operating the application, can be set as attribute information for each person. Clicking on the representative face 1502 of the person in FIG. 11 enables the birthday of the person clicked on to be input at a first input portion 1505 shown at the bottom of the screen. Relationship information as to the person clicked on can be input at a second input portion 1506.

This input person attribute information is managed in the database module 202 separately from the image attribute information, in an XML format such as illustrated in FIG. 12, unlike the attribute information correlated with the images in the previous description.

Figure 13:
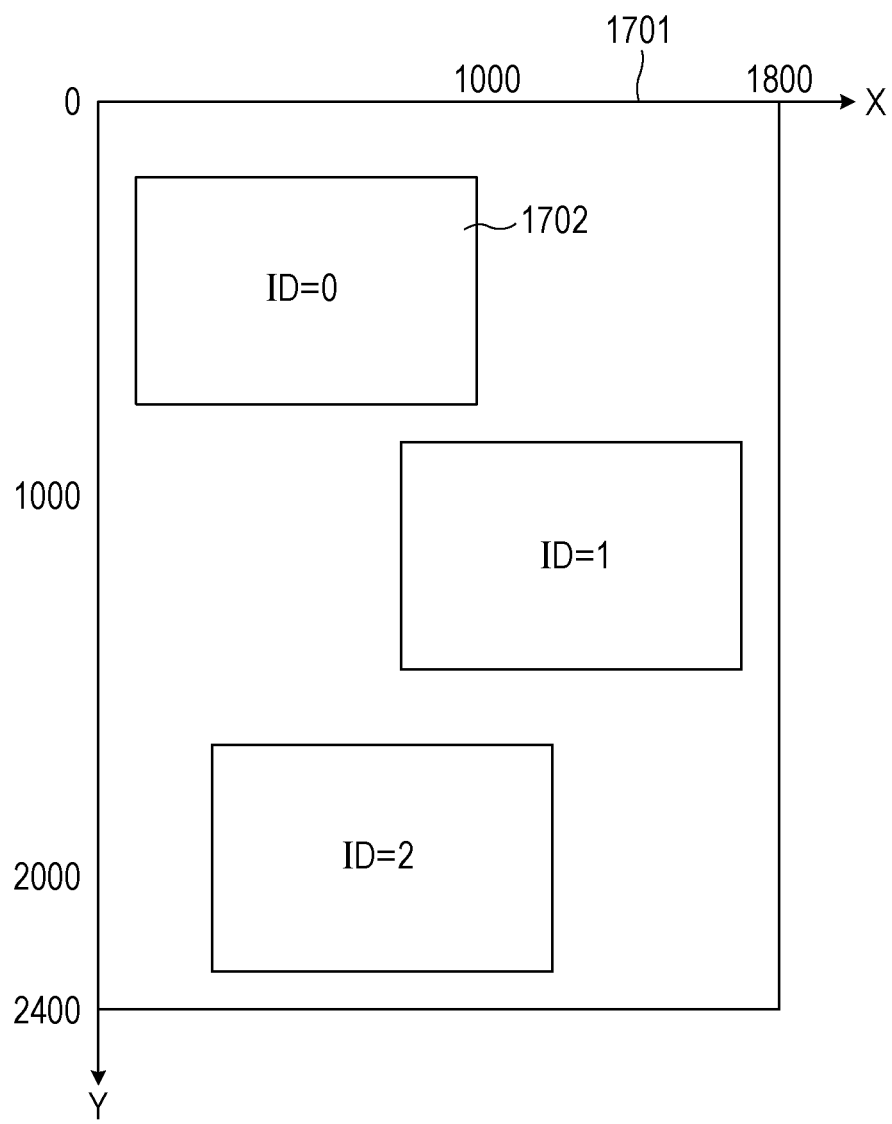
FIG. 13 is a diagram illustrating an example of a layout template.
Figure 15:
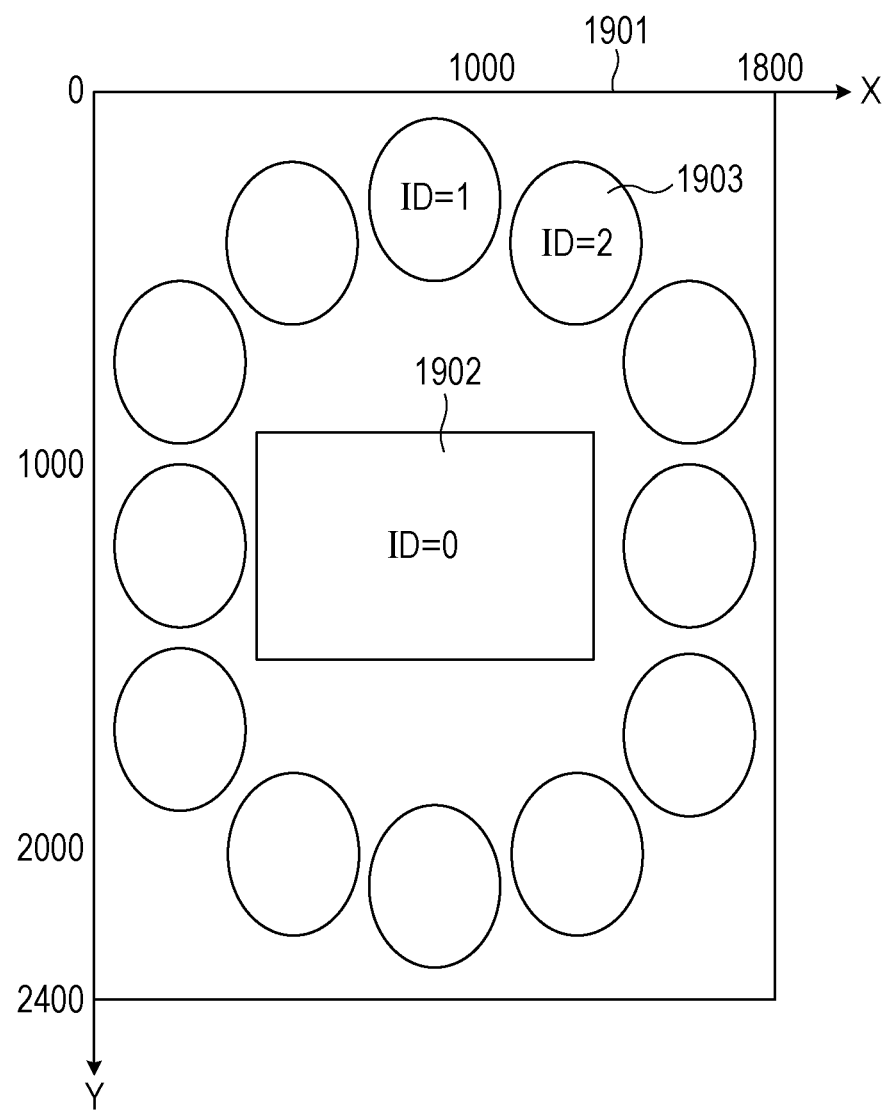
FIG. 15 is a diagram illustrating an example of a layout template.

Various layout templates prepared beforehand are used in the layout generating processing according to the present embodiment. Examples of layout templates are illustrated in FIGS. 13 and 15, where multiple image placement frames (hereinafter used interchangeably with the term "slots") 1702, 1902, and 1903 are provided in the size of a sheet for layout.

A great number of such templates are prepared; these may be saved in the secondary storage device 103 at the point that the software for carrying out the present embodiment is installed in the image processing apparatus 115. Another method is to obtain a desired template group from an external server 114 on the Internet, via the interface 107 or the wireless LAN adapter 109.

These templates are described in a highly versatile structured language, such as XML, in the same way as that used in storing the sensing results as described above. FIGS. 14 and 16 illustrate examples of XML data.

In these examples, first, basic information of the layout page is described at the BASIC tag. Conceivable examples of basic information include layout theme, page size, resolution (dpi) of the page, and so forth. In the initial state of the templates in these examples, a Theme tag, which is the layout theme, is blank. The default settings for the basic information are page size of A4 and resolution of 300 dpi.

ImageSlot tags describe information of the image placement frames described above. An ImageSlot tag includes the two tags of ID tag and POSITION tag, which describe the ID and position of the image placement frame thereof. This position information is defined on an X-Y coordinate system of which the upper left corner is the origin, for example, as illustrated in FIGS. 14 and 16.

The ImageSlot tags are also used to set, for each slot, the shape of the slot and a recommended person group name to be placed in the slot. The template illustrated in FIG. 13 has a rectangular shape for all slots, as indicated by "rectangle" in the Shape tag in FIG. 14, and the person group name is recommended to be "MainGroup" by the PersonGroup tag.

The template illustrated in FIG. 15 has a rectangular shape for the slot 1902 situated at the middle, of which ID=0, as indicated by "rectangle" in the first Shape tag in FIG. 16, and the person group name is recommended to be "SubGroup". The slots 1903 of which ID=1 and ID=2 have oval shapes, as indicated by "ellipse" in the second and third Shape tags in FIG. 16, and the person group name is recommended to be "MainGroup". Many such templates are held in the present embodiment.

The application according to the present embodiment is arranged to be able to perform analysis processing on input image groups, automatically group persons, and display on a UI. The user can view the results, input attribute information for each person group such as name and birthday, and set ratings for each of the images. Moreover, a great number of layout templates, classified by theme, can be held.

The application according the present embodiment which satisfies the above-described conditions performs processing to automatically generate a collage layout which the user might like, and presents this to the user, at a certain timing (hereinafter referred to as "layout proposal processing").

FIG. 6 illustrates a basic flowchart for performing layout proposal processing. First, in S601, a scenario for the layout proposal processing is decided. A scenario involves deciding the theme and template of the layout to be proposed, setting of a person to be emphasized in the layout (main character), selection information if an image group to be used for generating a layout, and so forth. Scenario deciding methods will now be described by exemplifying two scenarios.

For example, in one assumed case, settings have been made such that layout proposal processing is to be automatically performed two weeks before the birthday of each person, and a person "son" automatically grouped in FIG. 11 is close to his first birthday. In this case, the theme "growth", which is a growth record, is decided as the theme for the layout to be proposed. Next, a template suitable for a growth record, such as illustrated in FIG. 15 is selected, and "growth" is described in the XML Theme tag portion, as illustrated in FIG. 22. Next, "son" is set as the main character "MainGroup" to be emphasized in the layout. Further, "son" and "father" are set as the "SubGroup" to be secondarily emphasized in the layout. Thereafter an image group to be used in the layout is selected. In the case of this example, a great number of image groups including images including the person "son" is extracted from groups of images shot from the day on which the person "son" was born, up to the present, and compiled into a list. This is an example of deciding a scenario for a growth record layout.

As a different example, in another assumed case, settings have been made such that in a case where certain event information has been registered within one month, layout proposal processing is executed. Once it has been determined from the event information registered in FIG. 10B that the user has gone on a family vacation several days ago, for example, and there is a great number of images from that trip stored in the secondary storage device 103, the scenario generating module 204 decides a scenario for proposing a layout for the family vacation. In this case, "travel" is decided as the theme for the layout to be proposed for the vacation trip. Next, a template having a layout such as illustrated in FIG. 13 is selected, and "travel" is described in the XML Theme tag portion, as illustrated in FIG. 23. Next, "son", "mother", and "father" are set as the main character "MainGroup" to be emphasized in the layout. Thus, XML features can be employed to set multiple persons as the "MainGroup". Thereafter, an image group to be used in the layout is selected. In the case of this example, the database is referenced, and a great number of image groups including a great number of images associated with the vacation event is extracted and compiled into a list. This is an example of deciding a scenario for a family vacation layout.

Next, automatic layout generating processing based on the above-described scenario is executed in S603 in FIG. 6.

Figure 17:
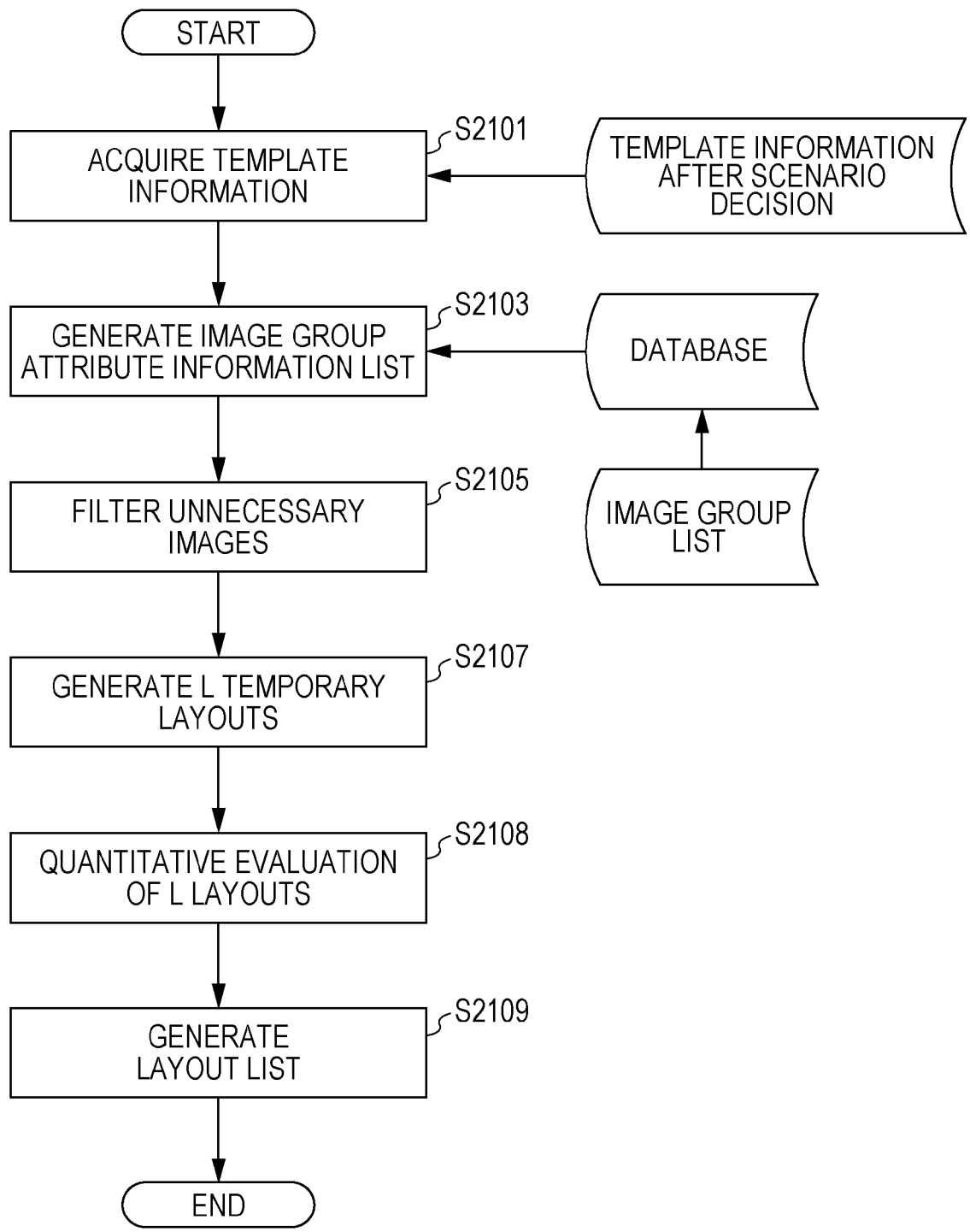
FIG. 17 is a flowchart illustrating automatic layout generating processing according to the first embodiment.

FIG. 17 illustrates a detailed processing flow of the layout generating module 205. The processing steps in FIG. 17 will now be described in order.

Template information decided in the above-described scenario deciding processing, after the theme and person group information have been set, is acquired in S2101.

Next, in S2103 feature amounts for each image are acquired from the database, based on the image list decided for the scenario as described above, and an image group attribute information list is generated. The image group attribute information list has a configuration where there are many IMAGEINFO tags illustrated in FIG. 9 arrayed as there are images in the image list.

Thus, image data itself is not directly handled in the automatic layout generating processing according to the present embodiment; rather, attribute information saved in a database from having performed sensing processing for each image beforehand, is used. This avoids the need for a very large memory region to store the image group, which would be necessary if the image data itself were handled at the time of performing the layout generating processing. This realizes reduction in the memory capacity needed for the layout generating processing.

Figure 18:
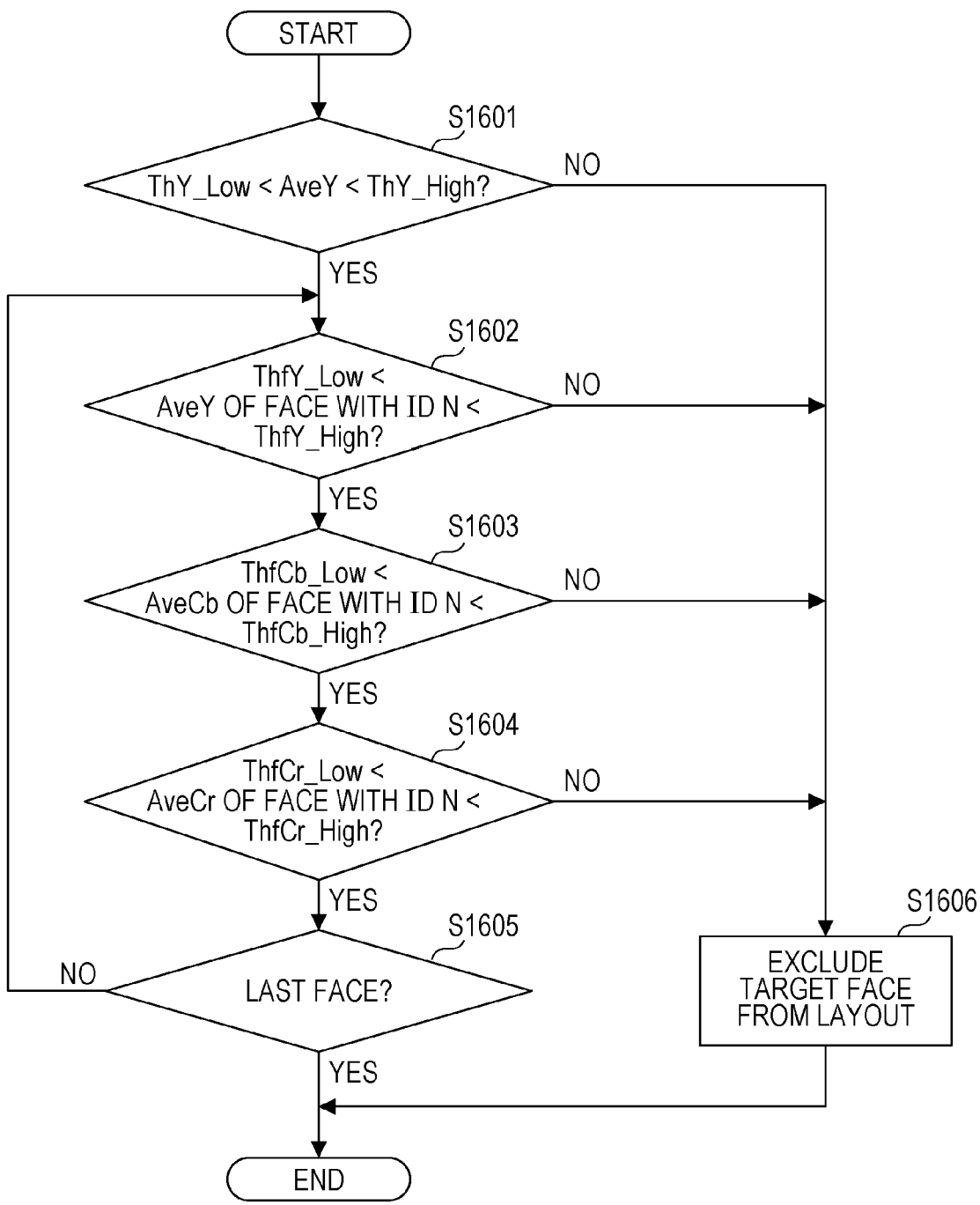
FIG. 18 is a flowchart illustrating unnecessary image filtering processing according to the first embodiment.

Specifically, attribute information of the input image group is first used in S2105 to perform filtering of unnecessary images from the input image group. The filtering processing is performed according to the flow illustrated in FIG. 18. First in S1601 in FIG. 18, determination is made for each image, regarding whether or not the average luminance thereof is included between threshold values (ThY_Low and ThY_High). If the determination results are No, the flow advances to S1606 where the image being handled (hereinafter "image of interest") is removed from being a layout candidate.

In the same way, the average luminance and average color difference components are determined for each face region included in the image of interest, regarding whether included between threshold values which indicate a good skin color region, S1602 through S1604. Only in a case where all determinations of S1602 through S1604 yield Yes is an image applied to the subsequent layout generating processing. Specifically, in S1602, determination is made regarding whether or not an AveY of a face region where ID=N is included in a range of predetermined thresholds (ThfY_Low and ThfY_High). In S1603, determination is made regarding whether or not an AveCb of a face region where ID=N is included in a range of predetermined thresholds (ThfCb_Low and ThfCb_High). In S1604, determination is made regarding whether or not an AveCr of a face region where ID=N is included in a range of predetermined thresholds (ThfCr_Low and ThfCr_High). In S1605, determination is made whether the last face or not. If not the last face, the flow returns to S1602, and if the last face, the processing ends.

This filtering processing is for removing images which clearly are unnecessary in the subsequent temporary layout creation processing, so the threshold values are preferably set relatively loosely. For example, if the difference between ThY_High and ThY_Low in the determination of overall image luminance in S1601 is drastically small as compared to the dynamic range of the images, the number of images which yield a Yes determination will be that much smaller. This is avoided in the filtering processing according to the present embodiment by setting the difference between the two thresholds as wide as possible while eliminating images which are clearly abnormal.

Next, a great number (L) of temporary layouts are generated in S2107 in FIG. 17, using the image group obtained for layout in the processing described above. Generating of the temporary layouts is performed by repeating processing of arbitrarily fitting the input images into the image placement frames of the acquired template. At this time, the parameters of image selection, placement, and trimming, are randomly decided, for example.

Figure 19A:
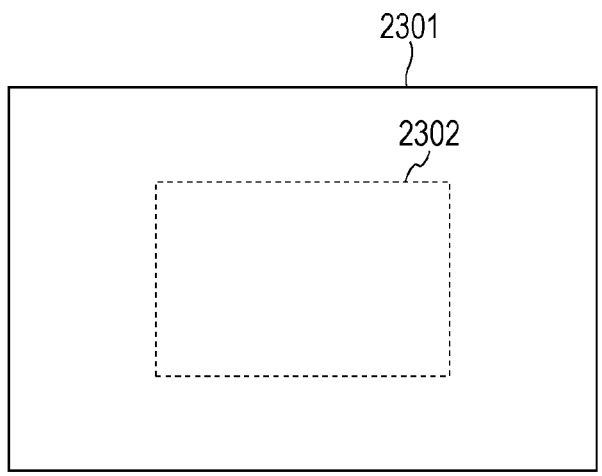
FIGS. 19A through 19C are explanatory diagrams.

An example of a standard for selecting images involves deciding which images to select from the image group when there are N image placement frames in the layout. An example of a standard for placement involves deciding which placement frames the selected multiple images are to be placed in. An example of a standard for trimming involves deciding a trimming ratio, which is how much to trim. The trimming ratio may be represented in terms of 0 to 100%, and trimming is performed at a predetermined trimming ratio with the center of the image as a reference, as illustrated in FIG. 19A. Reference numeral 2301 in FIG. 19A denotes the entire image, and 2302 denotes the frame where trimming has been performed at a trimming ratio of 50%.

As many temporary layouts as possible are generated based on the image selection, placement, and trimming standards. The temporary layouts that have been generated can be expressed as in the XML code illustrated in FIG. 24. The ID of the image selected for each slot is described in the ImageID tag, and the trimming ratio is described in the TrimmingRatio tag.

Note that the number L of temporary layouts generated here is decided by the processing amount of evaluation processing in a later-described layout evaluation step, and the capabilities of the image processing apparatus 115 performing the processing thereof. For example, several hundreds of thousands of temporary layouts are preferably generated.

The processing amount of evaluation processing in the layout evaluation step increases or decreases depending on how complex the layout template to be created is. For example, the greater the number of slots to be handled within the template is, the greater the evaluation processing amount becomes, and the more complex the layout conditions instructed for each slot are, the greater the evaluation processing amount becomes. Accordingly, the number L may be dynamically determined after having estimated the complexity of the template to be generated beforehand. Suitably setting the number L is this way enables the response at the time of automatic layout creating, and the quality of the layout results, to be optimally controlled.

The generated layouts may be saved as files in the secondary storage device 103 in the XML format illustrated in FIG. 24 with IDs appended to each, or may be stored in the RAM 102 using other data structures.

Qualitative evaluation of the great number of generated temporally layouts is then performed in S2108 in FIG. 17. Specifically, the L temporary layouts which have been created are each subjected to evaluation, using predetermined layout evaluation amounts. Table 3 illustrates an example of layout evaluation amounts in the present embodiment. The layout evaluation amounts according to the present embodiment can be primarily classified into three categories, as illustrated in Table 3.

TABLE 3

Example of Layout Evaluation Values in Automatic Layout

| Category | Evaluation items | Score range | Importance by theme (weighting W) growth | travel ... |
|---|---|---|---|---|
| Evaluation of individual image | Suitability of brightness | 0 to 100 | 0.5 | 1.0 |
| | Suitability of saturation | 0 to 100 | 0.5 | 1.0 |
| Evaluation of image and slot match | Person match | 0 to 100 | 1.0 | 0.5 |
| | Determination of trimming omission | 0 to 100 | 1.0 | 0.5 |
| Evaluation of balance in page | Image similarity | 0 to 100 | 0.5 | 1.0 |
| | Variation in shade of color | 0 to 100 | 0.5 | 1.0 |
| | Variation in face size | 0 to 100 | 0.5 | 1.0 |
| Other | User preferences | 0 to 100 | 0.8 | 0.8 |

Figure 19B:
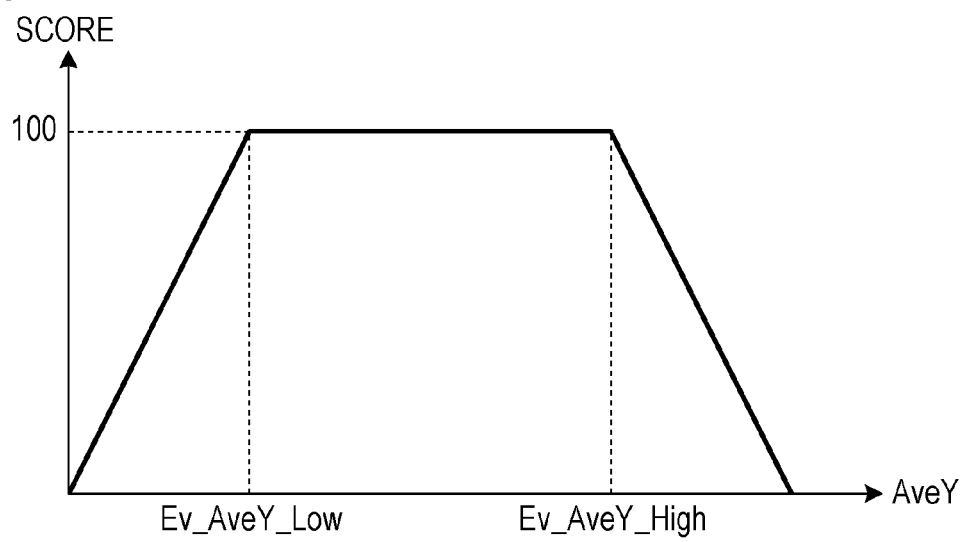
Figure 19C:
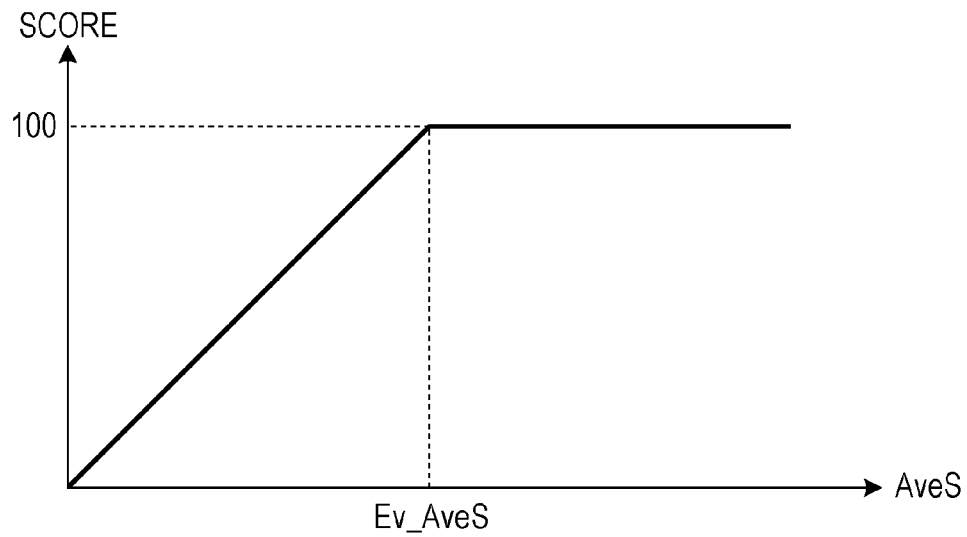

The first is evaluation amounts of individual images. This involves determining the brightness and saturation of the image, state of blurring amount due to shaking or the like, and so forth, and grading by scores. An example of grading by scores according to the present embodiment will be described. For example, suitability of brightness is set such that the score value is 100 within a predetermined range for average luminance, and the score value drops outside of that predetermined range, as illustrated in FIG. 19B. Also, suitability of saturation is set such that the score value is 100 if the saturation of the overall image is greater than a predetermined saturation value, and the score value gradually drops if smaller than the predetermined value, as illustrated in FIG. 19C. Determination of the state of amount of blurring due to shaking will be described later in detail.

Figure 20:
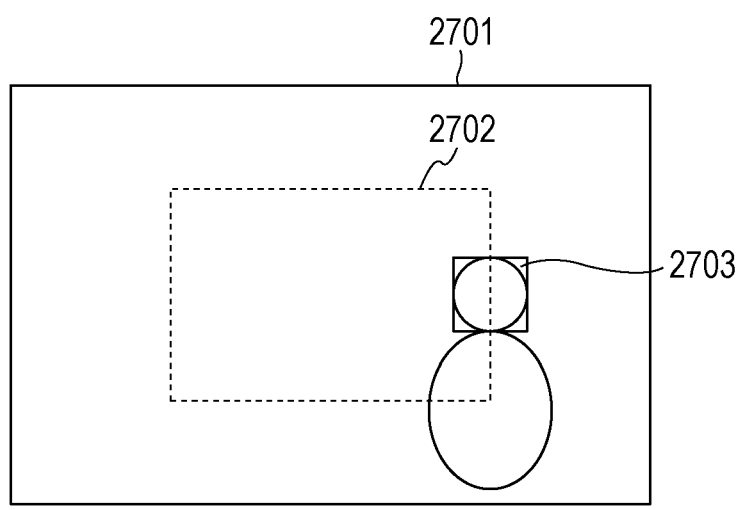
FIG. 20 is an explanatory diagram regarding trimming omission determination processing.

The second is evaluation of suitability between images and slots. Examples of evaluation of suitability between images and slots include person match, and trimming omission determination regarding omission by trimming. The person match represents the ratio of matching between the person specified for a slot and the person in the image actually placed in this slot. For example, if "father" and "son" have been specified in the PersonGroup specified in the XML code for a certain slot, and there are two people in an image assigned to the slot, the person match score is 100 if both of these two persons are in the image. If only one of the two is in the image, the person match score is 50, and the person match score is 0 if neither is in the image. The match for the entire page is obtained by averaging the matches calculated for each slot. Trimming omission of a trimming region 2702 is determined as follows, for example. In a case where a position 2703 of a face in the image has been identified, a trimming omission score value is calculated on a scale of 0 to 100, in accordance with the area of the face which has been omitted by the trimming. If the area omitted by trimming is 0, the score is 100, and conversely if the entire face region is missing, the score is 0, as illustrated in FIG. 20.

The third is evaluation of valance within the layout page. Examples of evaluation values to evaluate balance include similarity of images, variation in pixel value distribution, and variation in objects.

Image similarity will now be described as an evaluation amount for evaluating balance within the layout page. Image similarity is the similarity of images within each layout page, calculated for each of the layout pages of temporary layouts of which a great number is generated. For example, if a layout based on a vacation theme is to be created, and images which are very similar are arrayed in the layout, this may not be a very good layout in some cases. Accordingly, the similarity may be evaluated by date/time of photography. Images with close date/time of photography are likely to have been taken at close locations, while images with more removed date/time of photography are more likely to have been taken for difference scenes. The date/time of photography may be acquired from the image attribute information stored beforehand in the database module 202 for each image, as illustrated in FIG. 9. Similarity is calculated from the date/time of photography as follows. Assumption will be made that a temporary layout, which is currently a temporary layout of interest, has a layout of four images as illustrated in Table 4.

Date/time of photography information is attached to each image identified by image ID. Specifically, the year, month, date, and time (year YYYY, month MM, date DD, hour HH, minute MM, and second SS) is attached as date/time of photography. The amount of time between the two images out of these four images of which the date/time of photography is the closest, i.e., the photography time interval is short, is calculated.

TABLE 4

| Image ID | Date/time of photography (YYYYMMDD:HHMMSS) |
|---|---|
| 25 | 20100101:120000 |
| 86 | 20100101:150000 |
| 102 | 20100101:170000 |
| 108 | 20100101:173000 |

In this case, the 30 minutes between the image IDs 102 and 108 is the shortest interval. This interval is taken as MinInterval, and stored in increments of seconds. That is to say, 30 minutes is 1800 seconds. This MinInterval is calculated for each of the L temporary layouts, and stored in an array stMinInterval[1]. Next, the greatest value MaxMinInterval in the stMinInterval[1] is obtained. Accordingly, a similarity evaluation value Similarity[1] of the 1st temporary layout can be obtained as follows.

Similarity[1]=100×stMinInterval[1]/MaxMinInterval

As can be seen here, the greater the smallest photography time interval is, the closer Similarity[1] is to 100, and the smaller the photography time interval is the closer Similarity [1] is to 0. Accordingly, this is effective as an image similarity evaluation value.

Description will be made regarding variation in pixel value distribution, as an evaluation amount for evaluating balance within the layout page. Variation in shade of color will be described here as an example of variation in pixel value distribution. For example, if a layout based on a vacation theme is to be created, and images which are very similar in color (e.g., blue sky, green mountains, etc.) are arrayed in the layout, this may not be a very good layout in some cases. Accordingly, in this case, layouts with greater variation in color are evaluated highly. Variance of average hue AveH of the images in the 1st temporary layout, which is currently the temporary layout of interest, is calculated, and stored as color shade variation tmpColorVariance[1]. Next, the greatest value MaxColorVariance in the tmpColorVariance[1] is obtained. Accordingly, a color shade variation evaluation value ColorVariance[1] of the 1st temporary layout can be obtained as follows.

ColorVariance[1]=100×tmpColorVariance[1]/MaxColorVariance

As can be seen here, the greater the variation in average hue of the images placed in the page is, the closer ColorVariance[1] is to 100, and the smaller the variation in average hue is, the closer ColorVariance[1] is to 0. Accordingly, this is effective as a color shade variation evaluation value. Note however, that variation in pixel value distribution is not restricted to the above-described example.

Description will be made regarding variation in objects, as an evaluation amount for evaluating balance within the layout page. Variation in size of faces will be described here as an example of variation in objects. For example, if a layout based on a vacation theme is to be created, and images with faces which are very similar in size are arrayed in the layout, this may not be a very good layout in some cases. A good layout might be images with large faces and small faces laid out in a well-balanced manner. Accordingly, in this case, layouts with greater variation in face size are evaluated highly. A variance value of face size (distance along diagonal line from upper left to lower right of face) after placement in the 1st temporary layout, which is currently the temporary layout of interest, is calculated, and stored as tmpFaceVariance[1]. Next, the greatest value MaxFaceVariance in the tmpFaceVariance[1] is obtained. Accordingly, a face size variation evaluation value FaceVariance[1] of the 1st temporary layout can be obtained as follows.

FaceVariance[1]=100×tmpFaceVariance[1]/MaxFaceVariance

As can be seen here, the greater the variation in the size of faces placed in the page is, the closer FaceVariance[1] is to 100, and the smaller the variation in the size of faces is, the closer FaceVariance[1] is to 0. Accordingly, this is effective as a face size variation evaluation value. Note however, that variation in objects is not restricted to the above-described example.

Another category which can be considered here is user preference evaluation. Even if a layout has low evaluation values as determined by the above-described various types of evaluation amounts, a layout which includes photographs which the user personally likes may be a good layout for that user, in some cases. Accordingly, evaluation using evaluation amounts based on user preferences is preferably performed, so as to avoid inhibiting selection of such layouts. The user can set ratings for each of the images beforehand, and accordingly preferences can be evaluated beforehand. Preferences can also be automatically evaluated based on number of times viewed, amount of time viewed, and so forth, for example. Information used for such evaluations can be calculated based on information managed in a FavoriteRate tag, ViewingTimes tag, and PrintingTimes tag.

Average values FavorteRateAve[1], ViewingTimesAve[1], and PrintingTimesAve[1], obtained from each of the values of tag information of all images placed in each slot, are calculated for the 1st temporary layout. Summation thereof enables the user preference evaluation value UserFavor[1] to be obtained as follows.

UserFavor[1]=FavorteRateAve[1]+ViewingTimesAve[1]+PrintingTimesAve[1]

The higher the user has rated, the more times viewed, and the more times printed, the images used in the layout, the higher the UserFavor[1] value is. Accordingly, determination can be made in the present embodiment that the higher the UserFavor[1] value is, the closer the layout is to what the user prefers.

Each of the multiple evaluation values calculated for each temporary layout as described above, are integrated as described below, to yield a layout evaluation value for each temporary layout. EvalLayout[1] represents the integrated evaluation value of the 1st temporary layout, and EvalValue [n] represents the value of the N evaluation values calculated above (including each of the evaluation values in Table 3). The integrated evaluation value can be obtained as follows.

$$EvalLayout[l] = \sum_{n=0}^{N} EvalValue[n] \times W[n]$$

In the above expression, W[n] is weighting of each evaluation value of each scene in Table 3. A different weighting is set for each layout theme. For example, comparing the themes growth record "growth" and vacation "travel" in Table 3, it is often preferable for a vacation theme to have as many good-quality photographs from as many difference scenes laid out. Accordingly, the weighting is set with emphasis on individual evaluation values of images, and balance evaluation value within the page. On the other hand, in the case of growth record "growth", it is often preferable for the main character to match each slot, rather than having variation in images, since it is the growth record of this main character that is of interest. Accordingly, the weighting is set with emphasis on evaluation of match between images and slots, rather than balance in the page or individual evaluation values of images. Note that the importance level for each theme has been set as shown in Table 3 in the present embodiment.

The EvalLayout[1] calculated in this way is used in S2109 to generate a layout list LayoutList[k] for layout result display. The method for creating the layout list LayoutList [k] will be described in detail later. This layout list LayoutList[k] is used to correlate a k'th layout order in the rendering display in S605 illustrated in FIG. 6, as to a layout order 1 regarding which evaluation has ended. The content of the layout list LayoutList[k] is the value of the layout order value 1. Display is performed in order from those with a small k in the layout list LayoutList[k].

Figure 21:
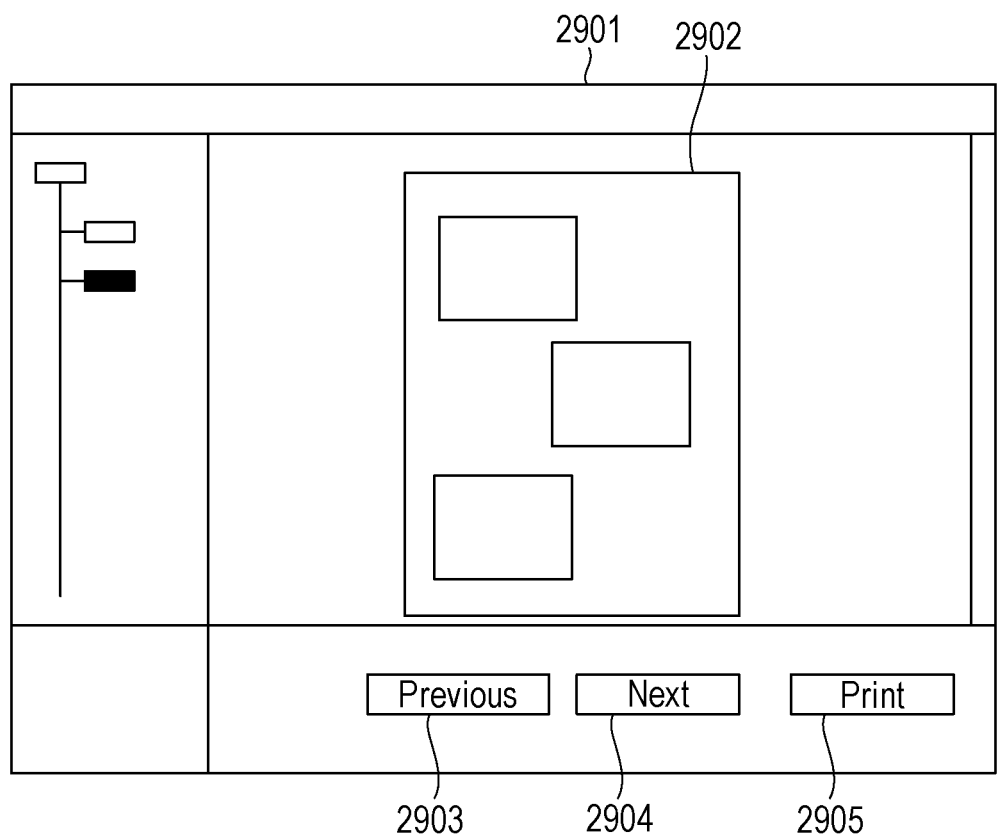
FIG. 21 is a diagram illustrating a display example of automatic layout generating results according to the first embodiment.

Returning to FIG. 6, the layout results obtained by the above-described processing are rendered in S605 in FIG. 6 and are displayed as illustrated in FIG. 21. In S605, a layout identifier stored in LayoutList[0] is first read out, and the temporary layout result corresponding to the identifier is read out from the secondary storage device 103 or RAM 102. Template information, and image names assigned to the slots in the template, are set in the layout result as described above. Accordingly, the layout result is rendered using a drawing function of the operating system (OS) operating on the image processing apparatus 115, based on this information, and displayed as indicated by reference numeral 2902 in FIG. 21.

In FIG. 21, pressing a Next button 2904 causes the next highest evaluation result, i.e., the layout identifier stored in LayoutList[1] which has the next highest score, to be read out, rendered in the same way as described above, and then displayed. Thus, the user can view proposed layouts of many variations. Pressing a Previous button 2903 displays layouts displayed earlier. Further, if the user likes a displayed layout, the layout result 2902 can be printed from the printer 112 connected to the image processing apparatus 115, by the user pressing a print button 2905.

Now, scoring of shaking amount when performing quantitative evaluation of the great number (L) of layouts in S2108 in FIG. 17 will be described in detail. In the scoring of shaking amount in FIG. 17, the magnitude of shaking is first evaluated. The magnitude of shaking can be evaluated using a cepstrum enabling evaluation in shaking magnitude (shaking amount) and direction, for example. Known methods can be used to calculate shaking amount and direction, such as the method disclosed in U.S. Pat. No. 7,617,826B2, for example. This methods enables the magnitude and direction of shaking to be obtained by blur kernel. Note that the method for calculating shaking amount and direction is not restricted to this.

The magnitude of shaking is not restricted to evaluation by shaking amount and shaking direction. For example, the shaking amount and shaking direction may be calculated, and difference as to blurring effects using depth of field detected and evaluated. The term "shaking" as used here occurs due to relative relationship between the camera and the subject changing during the exposure period of the camera. While the effects of blurring can be reduced by configuring the optical system such that the relative relationship between the image sensing element and the light axis is maintained during the exposure period, shaking cannot be completely eliminated if vibration of the photography system is excessively detected, or the exposure time is long.

Evaluation of the shaking amount may be performed such that the entire image to be evaluated is evaluated all at once, or the image to be evaluated may be sectioned into regions which are evaluated individually. Alternatively, the weighting of each region may be changed to calculate the shaking amount of the overall image. In a case of sectioning the image to be evaluated into regions, the shaking amount may be evaluated according to attributes such as central persons or face regions in a proposed story, regions of added focus points, and so forth. Sectioning the image to be evaluated into regions for shaking amount evaluation allows the shaking amount to be calculated for each region, and difference as to blurring effect using depth of field can be detected.

Also, an arrangement may be made where, instead of calculating the shaking amount of all regions included in the image and taking this as the shaking amount of the overall image as described above, the shaking amount in a predetermined region, which is a region of interest so as to say, may be calculated and taken as the shaking amount of the overall image. By using the shaking amount in a region of interest for evaluation, the likelihood of erroneously determining an image which intentionally includes blurring to be an image including a large amount of shaking can be reduced.

Next, the evaluation amount of image shaking is calculated. The evaluation amount of image shaking is calculated based on the magnitude of shaking, and the size of the image when actually laid out. That is to say, the shaking amount of the image is converted into the size when laid out. For example, an enlargement/reduction ratio is calculated from the size after layout and the size of the original image (e.g., the data size of the original image), and the product of the shaking amount and the enlargement/reduction ratio is taken as the evaluation amount of image shaking. The size after layout is evaluated at the point of observing the output article (e.g., the printed product). Conversion is made into the output size of the image, specifically the printing size when printed on a sheet of a specified size. Accordingly, an image laid out on a printing medium can be appropriately evaluated even if conditions do not change on the monitor.

In a case of trimming a portion of the original image for use, the evaluation amount of image shaking may be obtained by calculating the enlargement/reduction ratio from a size obtained by trimming coordinates and a size after layout, and obtaining the product of the shaking amount and the calculated enlargement/reduction ratio. In a case where the user desires to propose a layout image including an image including shaking at a level where face detection is possible, the shaking amount of the face region may be calculated from a coordinate position in the face detection performed in S303, and the evaluation amount calculated based upon this. Specifically, the product of the calculated shaking amount of the face region and the scaling factor obtained from the size after layout (enlargement/reduction ratio in this case) is taken as the evaluation amount of the image. Also, while description has been made above where the product of the shaking amount and the enlargement/reduction ratio is taken as the shaking evaluation amount, an arrangement may be made where the observation distance is assumed to differ depending on the layout size, and the shaking evaluation amount may be calculated using the assumed observation distance. If an assumption is made that the greater the layout image size is, the farther away observation will be made from, the lower the relative evaluation value will be, due to the product of the layout size and the shaking amount.

The shaking evaluation amount calculated by the above-described method is normalized as an individual evaluation amount, and used as a score. Note that in a case of performing overall evaluation of the shaking evaluation amount and other evaluation amounts in evaluation of individual images, calculation may be performed with weighting coefficients for each theme applied.

In evaluation of shaking amount by the above-described method, the shaking amount is greater in images laid out with larger sizes, and the individual evaluation is lower, meaning that the score is lower. On the other hand, the shaking amount is smaller in images laid out with smaller sizes, and the individual evaluation is higher, meaning that the score is higher.

Accordingly, a layout made including images with much shaking but at a small size will have an evaluation higher than a layout made including images with much shaking and at a large size, and accordingly will be more readily proposed as a layout. Also, a layout made including images with little shaking and at a large size will have a high evaluation, and accordingly will be readily proposed as a layout. According to the present embodiment, a proposal desirable for the user can be made from image data which the user owns, by evaluating the effects of images with shaking on images following layout. Thus, suitable layout candidates can be proposed to the user while keeping images with shaking from being omitted from layout candidates.

Second Embodiment

While description has been made in the first embodiment regarding evaluation of layout images including images with shaking, description will be made in a second embodiment regarding layout of images including noise. Note that configurations which are the same as those in the first embodiment will be omitted from description.

A case of performing noise evaluation as individual image evaluation will be described in the present embodiment. That is to say, scoring of noise when performing quantitative evaluation of the great number (L) of layouts in S2108 in FIG. 17 will be described in detail. Noise appears in the image as dark noise of the image sensing element in a case where exposure intensity of the camera is low, for example.

To perform scoring of noise, first, the noise amount is evaluated. The noise amount can be calculated using sensitivity information (e.g., International Organization for Standardization (ISO) sensitivity) recorded at the time of shooting with the camera. Alternatively, noise at low-sensitivity portions in each color filter may be calculated by the filter and taken as the noise amount. Specifically, the frequency of the noise is obtained by frequency analysis of the difference between the image after noise reduction filtering processing, and the original image. The noise frequency analysis results are taken as the noise amount.

Next, the noise evaluation amount of the image is calculated. The noise evaluation amount of the image can be calculated by the same method as that used for shaking evaluation amount in the first embodiment. For example, the noise evaluation amount of the image can be calculated based on the noise amount and the size of the image actually laid out. In a case of trimming a portion of the original image for use, the evaluation amount of image noise may be obtained by calculating the enlargement/reduction ratio from a size obtained by trimming coordinates and a size after layout, and obtaining the product of the noise amount and the calculated enlargement/reduction ratio.

The noise evaluation amount calculated by the above-described method is normalized as an individual evaluation amount in evaluation of individual images, and used as a score. Note that in a case of performing overall evaluation of the noise evaluation amount and other evaluation amounts, calculation may be performed with weighting coefficients for each theme applied.

The present embodiment can prevent high-frequency noise with low sensitivity visual features from spreading and becoming conspicuous due to the frequency artificially dropping. That is to say, the effects which an image including noise will have on the image after layout is evaluated, taking into consideration the fact that the degree to which noise can be tolerated depends on the layout size. Accordingly, a proposal desirable for the user can be made from image data which the user owns. Thus, suitable layout candidates can be proposed to the user while keeping images including noise from being omitted from layout candidates.

Other Embodiments

The basic configuration of the present disclosure is not restricted to the above-described configurations. The above-described embodiments are exemplary arrangements to realize the advantages of the present disclosure, and if using similar but different techniques or different parameters obtains advantages equivalent to those of the present disclosure, these are also included in the scope of the present disclosure.

While an example has been illustrated where the user uses a mouse pointer to perform instruction operations, operations are not restricted to instructions by a mouse pointer.

Also, while persons have been exemplified as objects in the above-described embodiments, objects are not restricted to persons. For example, recognition processing may be performed on pets such as dogs or cats to recognize these, and accordingly pets may be set as objects. Also, buildings, small items, and so forth can be recognized by shape recognition processing through edge detection and so forth, so buildings, small items, and so forth can be set as objects.

While a computer has been exemplified as the image processing apparatus in the above-described embodiments, this is not restrictive. The present disclosure is applicable to apparatuses which perform image processing, such as printers, copying machines, facsimile apparatuses, cellular phones, personal digital assistants (PDAs), image viewers, digital cameras, and so forth, for example.

The present disclosure maybe applied to a system configured including multiple apparatuses (e.g., a host computer, interface equipment, reader, printer, etc.), or may be applied to a standalone apparatus (e.g., printer, copying machine, facsimile apparatus, etc.).

The above-described embodiments may also be realized by executing the following processing. That is to say, software (program) realizing the functions of the above-described embodiments are supplied to a system or apparatus via a network or various types of storage mediums, and a computer (CPU or microprocessor unit (MPU)) of the system or apparatus reads out and executes the program. The program may be executed on a single computer, or multiple computers may be operated collaboratively to execute the program. There is no need to realize all of the above-described processing by software, and part or all of the processing may be realized by hardware such as application specific integrated circuits (ASIC) or the like. The CPU is not restricted to one CPU executing all processing; rather, multiple CPUs may collaboratively execute the processing.

According to the present disclosure, a suitable layout according to output size can be obtained by evaluating layout candidates in accordance with the size of subjects in the images, identified by the size of layout candidates to be output.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-184045, filed Sep. 5, 2013, which is hereby incorporated by reference herein in its entirety.

What is claimed is:

1. An apparatus comprising:
an obtaining unit configured to obtain an image group including one or more images;
a creating unit configured to create a layout candidate, by laying out the one or more images, hereinafter referred to as each image, included in the image group obtained by the obtaining unit; and
an evaluation unit configured to evaluate the layout candidate created by the creating unit, based on individual evaluation including image blurring evaluation for each image laid out within a layout image,
wherein the image blurring evaluation is evaluated based on a magnitude of blurring of each image and a size of each image placed in the layout image, and the image blurring evaluation of each image becomes lower when each image including the blurring is placed with a larger size in a layout candidate and the image blurring evaluation of each image becomes higher when each image including blurring is placed with a smaller size in a layout candidate,
wherein at least one of the obtaining unit, the creating unit, and the evaluating unit is implemented by at least one processor in the apparatus.

2. The apparatus according to claim 1, further comprising:
a scaling factor identifying unit configured to identify a scaling factor of each image based on a size of each image before being placed in the layout image and a size of each image when placed in the layout image,
wherein the image blurring evaluation is evaluated by calculating the magnitude of blurring of each image from the scaling factor identified by the scaling factor identifying unit,
wherein at least one of the obtaining unit, the creating unit, the evaluating unit, and the scaling identification unit is implemented by at least one processor in the apparatus.

3. The apparatus according to claim 1, further comprising:
a face region identifying unit configured to identify a face region in an image placed in the layout image;
wherein individual evaluation for each image includes evaluation of face regions identified by the face region identifying unit, and
wherein at least one of the obtaining unit, the creating unit, the evaluating unit, and the face region identifying unit is implemented by at least one processor in the apparatus.

4. The apparatus according to claim 1,
wherein individual evaluation for each image includes evaluation based on sensitivity information at a time of photography.

5. The apparatus according to claim 1,
wherein individual evaluation for each image includes evaluation of noise amount in each image.

6. The apparatus according to claim 1, further comprising:
a presenting unit configured to present at least one selected layout candidate of a plurality of layout candidates created by the creating unit, based on evaluation results from the evaluation unit, wherein at least one of the obtaining unit, the creating unit, the evaluating unit, and the presenting unit is implemented by at least one processor in the apparatus.

7. The apparatus according to claim 6,
wherein the presenting unit presents layout candidates of which evaluation results from the evaluation unit are high.

8. The apparatus according to claim 1,
wherein the magnitude of blurring of each image is a magnitude of blurring of all of regions included in each image.

9. The apparatus according to claim 1,
wherein the magnitude of blurring of each image is a magnitude of blurring of a region of interest included in each image.

10. A method executed by an apparatus, the method comprising:
obtaining, at the apparatus, an image group including one or more images;
creating, at the apparatus a layout candidate, by laying out the one or more images, hereinafter referred to as each image, included in the image group obtained by the obtaining; and
evaluating, at the apparatus, the layout candidate created in the creating;
wherein evaluation of the layout candidates is performed in the evaluating based on individual evaluation including image blurring evaluation for each image laid out within a layout image,
wherein the image blurring evaluation is evaluated based on a magnitude of blurring of each image and a size of each image placed in the layout image, and the image blurring evaluation of each image becomes lower when each image including the blurring is placed with a larger size in a layout candidate and the image blurring evaluation of each image becomes higher when each image including blurring is placed with a smaller size in a layout candidate.

11. The method according to claim 10, further comprising:
presenting at least one selected layout candidate of a plurality of created layout candidates, based on evaluation results.

12. The method according to claim 11,
wherein, in the presenting, layout candidates of which evaluation results from the evaluation unit are high is presented.

13. A non-transitory storage medium storing a program causing a computer to execute a method comprising:
obtaining an image group including one or more images;
creating a layout candidate, by laying out the one or more images, hereinafter referred to as each image, included in the image group obtained by the obtaining; and
evaluating the layout candidate created in the creating;
wherein evaluation of the layout candidates is performed in the evaluating based on individual evaluation including image blurring evaluation for each image, laid out within a layout image,
wherein the image blurring evaluation is evaluated based on a magnitude of blurring of each image and a size of each image placed in the layout image, and each image blurring evaluation of each image becomes lower when each image including the blurring is placed with a larger size in a layout candidate and the image blurring evaluation of each image becomes higher when each image including blurring is placed with a smaller size in a layout candidate.

14. The non-transitory storage medium according to claim 13, further comprising:
presenting at least one selected layout candidate of a plurality of created layout candidates, based on evaluation results.

15. The non-transitory storage medium according to claim 14,
wherein, in the presenting, layout candidates of which evaluation results from the evaluation unit are high is presented.

* * * * *